United States Patent
Mochida

(10) Patent No.: US 9,014,149 B2
(45) Date of Patent: Apr. 21, 2015

(54) COMMUNICATION APPARATUS AND BASE STATION APPARATUS

(75) Inventor: Eiji Mochida, Osaka (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 187 days.

(21) Appl. No.: 13/514,701

(22) PCT Filed: Jan. 18, 2011

(86) PCT No.: PCT/JP2011/050760
§ 371 (c)(1),
(2), (4) Date: Jun. 8, 2012

(87) PCT Pub. No.: WO2011/090028
PCT Pub. Date: Jul. 28, 2011

(65) Prior Publication Data
US 2012/0243503 A1    Sep. 27, 2012

(30) Foreign Application Priority Data

Jan. 22, 2010   (JP) .................................. 2010-012517
Mar. 19, 2010   (JP) .................................. 2010-064039
Mar. 19, 2010   (JP) .................................. 2010-064509

(51) Int. Cl.
H04W 4/00      (2009.01)
H04W 28/04     (2009.01)
(Continued)

(52) U.S. Cl.
CPC ............ *H04W 28/048* (2013.01); *H04W 28/04* (2013.01); *H04W 72/04* (2013.01); *H04W 72/12* (2013.01); *H04W 84/045* (2013.01)

(58) Field of Classification Search
None
See application file for complete search history.

(56) References Cited

U.S. PATENT DOCUMENTS

2005/0085192 A1* 4/2005 Iwami et al. ............... 455/67.16
2007/0070879 A1* 3/2007 Yoshida et al. ............. 370/208
(Continued)

FOREIGN PATENT DOCUMENTS

JP    2004-229088    8/2004
JP    2005-151377    6/2005
(Continued)

OTHER PUBLICATIONS

"OFDM/OFDMA Textbook" 1st edition, Impress R&D, 2008, pp. 310-312 and 329, including concise explanation of the relevance.
(Continued)

*Primary Examiner* — Chirag Shah
*Assistant Examiner* — Jenkey Van
(74) *Attorney, Agent, or Firm* — Drinker Biddle & Reath LLP

(57) ABSTRACT

There is provided a communication apparatus capable of effectively removing interference waves from a received signal while reducing the computation load. The communication apparatus includes a weight calculating unit. The weight calculating unit includes a calculating unit and a selecting unit. The calculating unit calculates a first weight and a second weight. The first weight is obtained, for a target known signal being an update target, by updating, using the target known signal, a weight of a first another known signal updated immediately before performing an update using the target known signal. The second weight is obtained, for a target known signal being an update target, by updating, using the target known signal, a weight of a second another known signal. The selecting unit selects one of the first weight and the second weight that has a lower estimation error.

9 Claims, 27 Drawing Sheets

(51) Int. Cl.
*H04W 72/04* (2009.01)
*H04W 72/12* (2009.01)
*H04W 84/04* (2009.01)

(56) References Cited

U.S. PATENT DOCUMENTS

| | | | |
|---|---|---|---|
| 2009/0196166 A1 | 8/2009 | Hamaguchi et al. | |
| 2009/0196272 A1* | 8/2009 | Tsutsui | 370/342 |
| 2010/0189202 A1* | 7/2010 | Imao | 375/344 |
| 2010/0272194 A1* | 10/2010 | Zhengang et al. | 375/260 |
| 2011/0025560 A1* | 2/2011 | Crozzoli et al. | 342/373 |

FOREIGN PATENT DOCUMENTS

| | | |
|---|---|---|
| JP | 2005-229466 | 8/2005 |
| JP | 2006-319959 | 11/2006 |
| JP | 2008-028515 | 2/2008 |
| JP | 2008-28729 | 2/2008 |
| JP | 2008-211304 | 9/2008 |
| JP | 2009-177532 | 8/2009 |
| JP | 2009-245337 | 10/2009 |
| WO | 2006/098147 | 9/2006 |
| WO | WO 2007/142313 | 12/2007 |

OTHER PUBLICATIONS

Hideo Kobayashi et al., "Proposal of OFDM Channel Estimation Method Using Discrete Cosine Transform," Institute of Electronics, Information, and Communication Engineers, Jan. 1, 2005, vol. J88-B, No. 1, pp. 256-268.

Haruhito Yoshida et al., "Fading Compensation Scheme Using Metrics Comparison for Burst Mode COFDM Transmission Using Double-Ended Pilot Symbols," Journal B of Institute of Electronics, Information, and Communication Engineers, Oct. 1, 2005, vol. J88-B, No. 10, pp. 2119-2122.

Takamichi Inoue et al., "Proposal on Generation method of Reference Signal in LTE-Advanced Uplink," Technical Research Report of Institute of Electronics, Information, and Communication Engineers, Dec. 10, 2009, vol. 109, No. 341, pp. 125-129, RCS2009-188.

Hideo Kobayashi et al., "Proposal of OFDM Channel Estimation Method using Discrete Cosine Transform," Technical Report of The Institute of Electronics, Information and Communication Engineers, Japan; The Institute of Electronics, Information and Communication Engineers, Nov. 13, 2003, vol. 103, No. 456, pp. 45-50, A.P2003-153.

\* cited by examiner

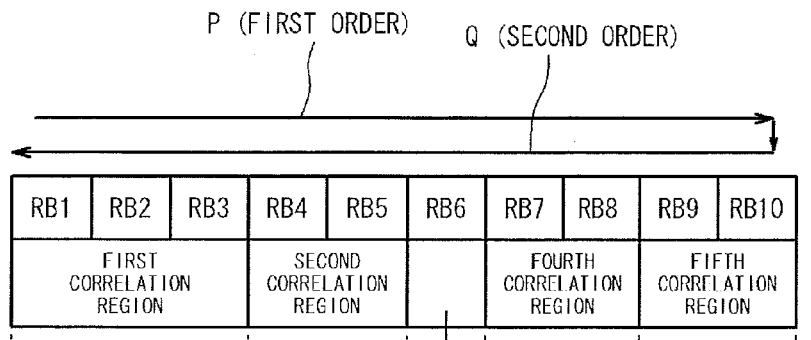
FIG. 8(a)
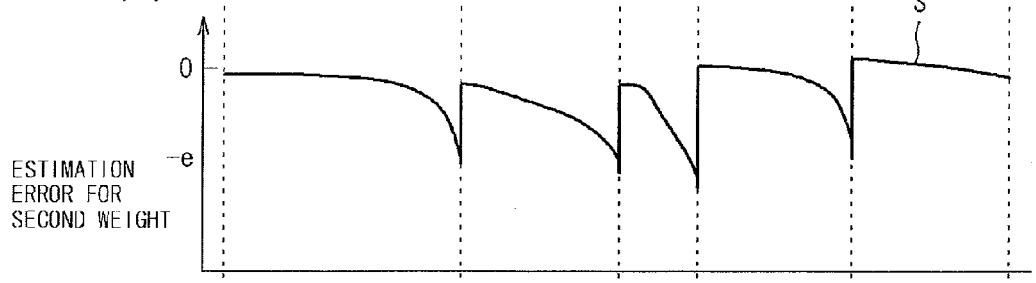
FIG. 8(b)
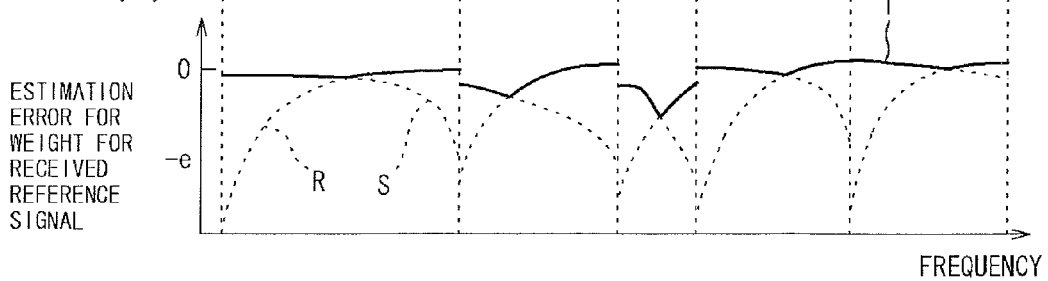
FIG. 8(c)

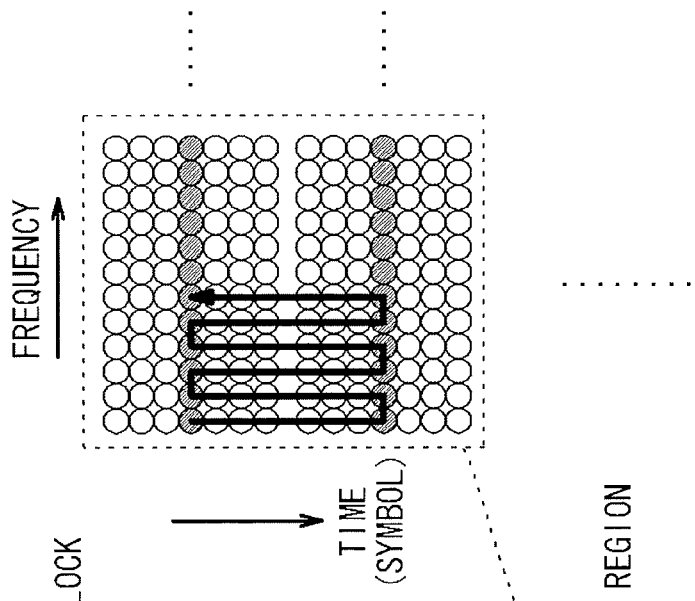
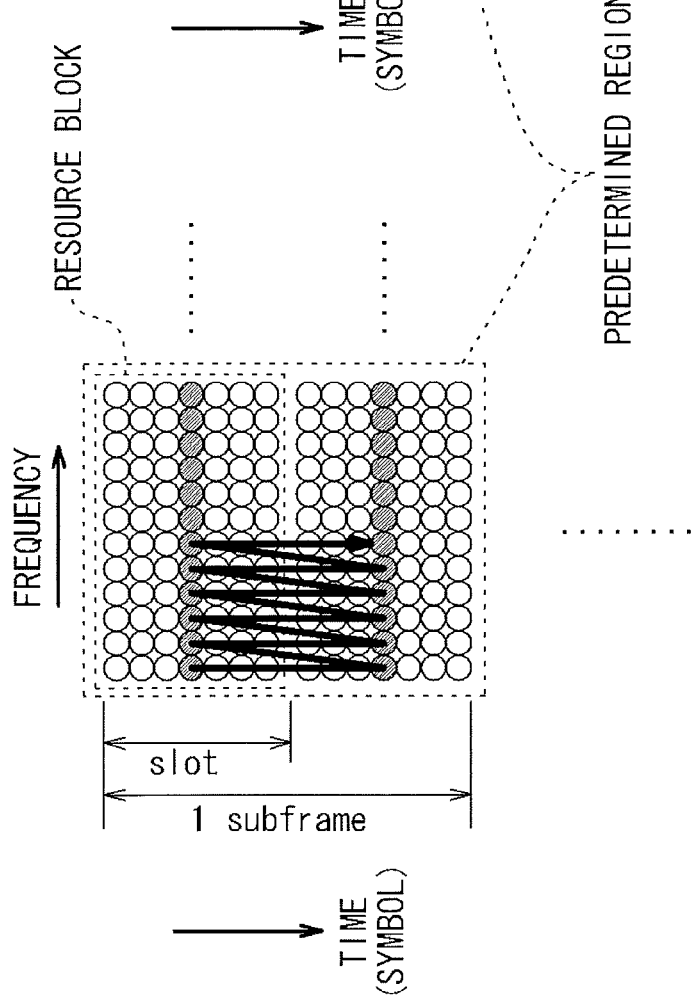

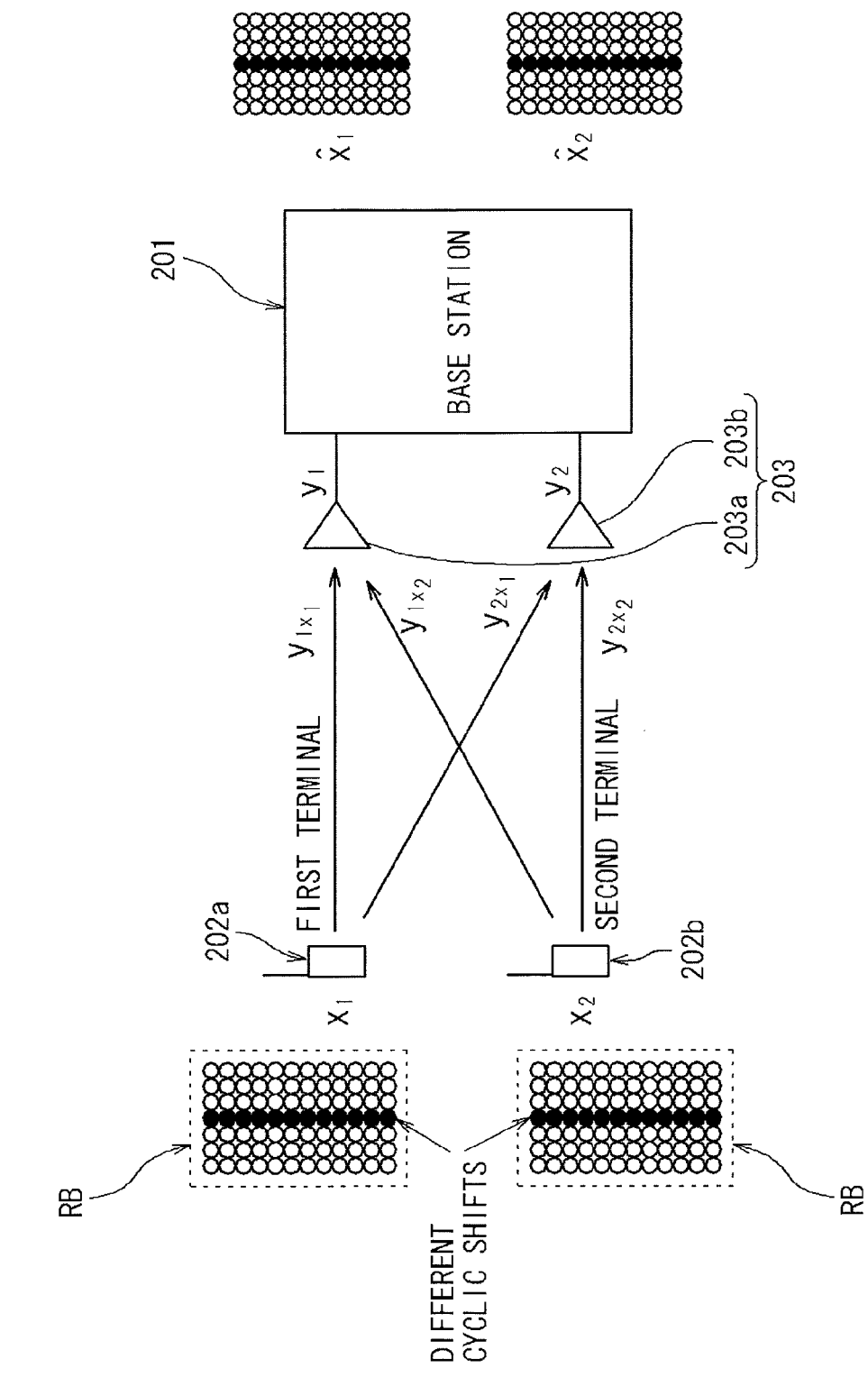

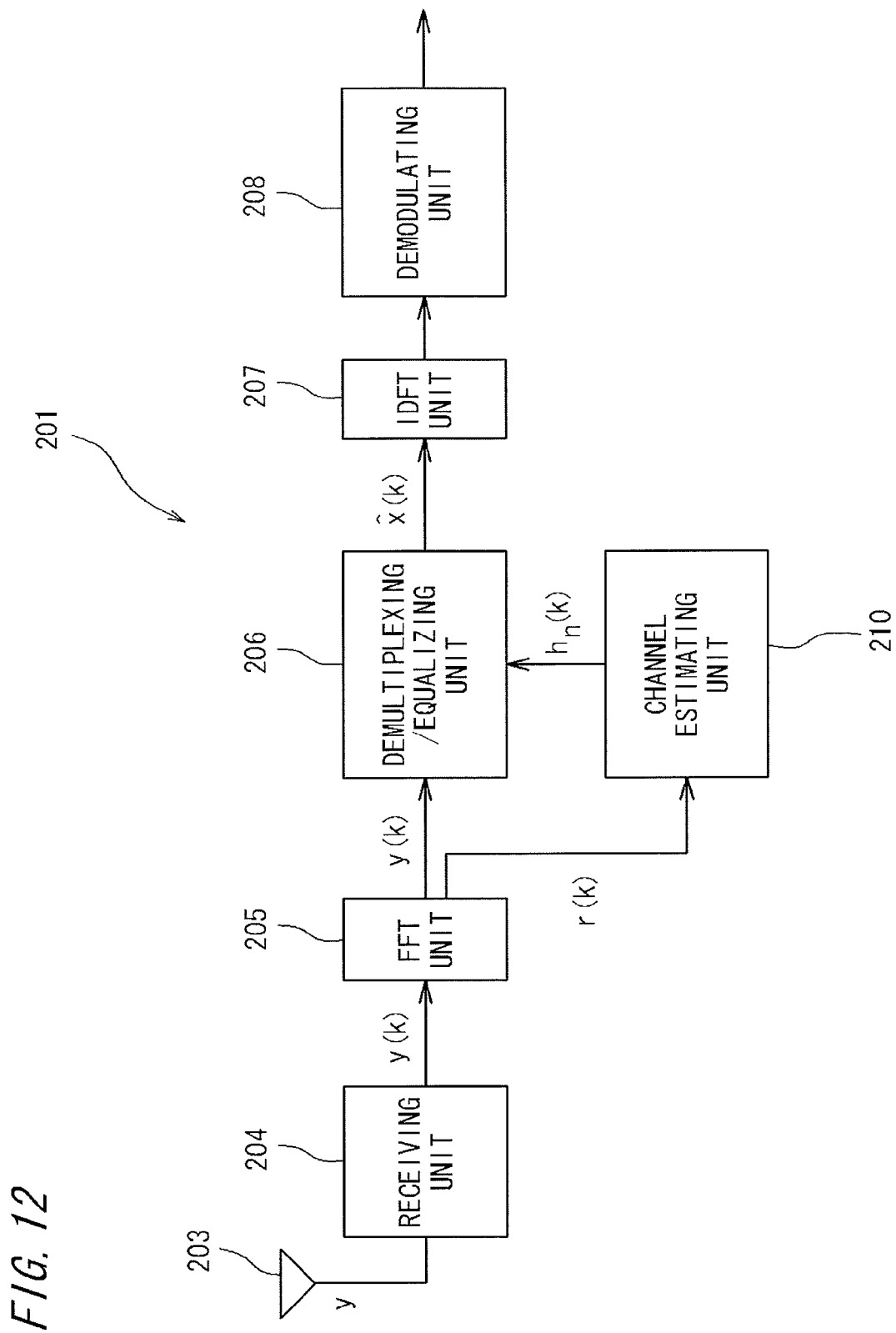

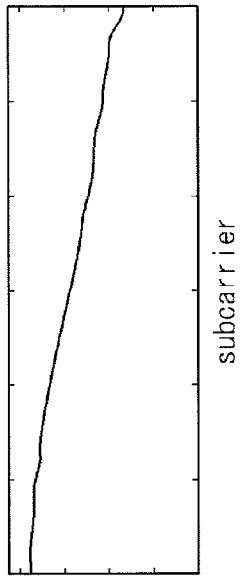
FIG. 18(a-2)
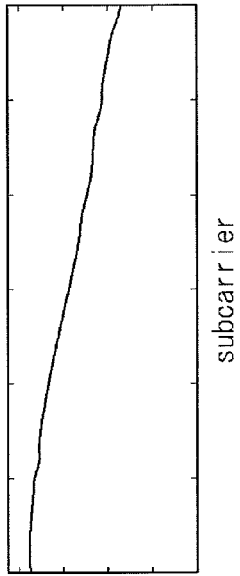
FIG. 18(b-2)
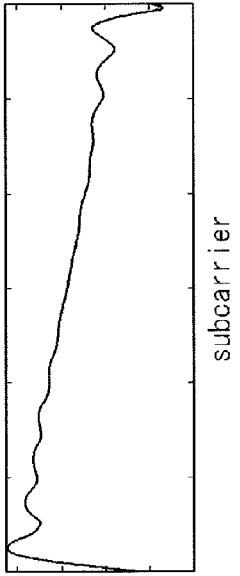
FIG. 18(c-2)
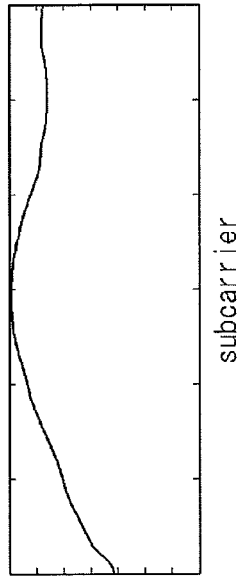
FIG. 18(a-1)
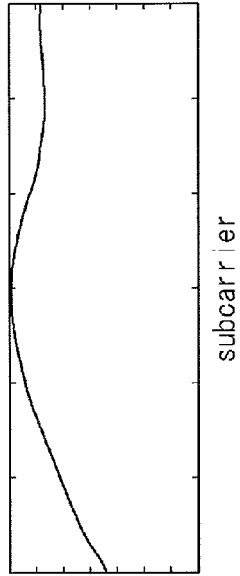
FIG. 18(b-1)
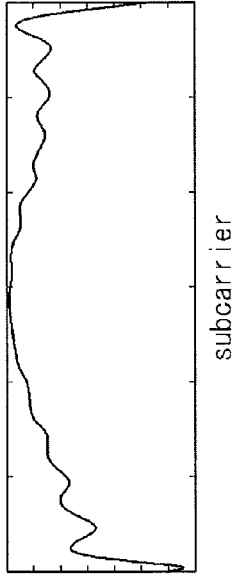
FIG. 18(c-1)

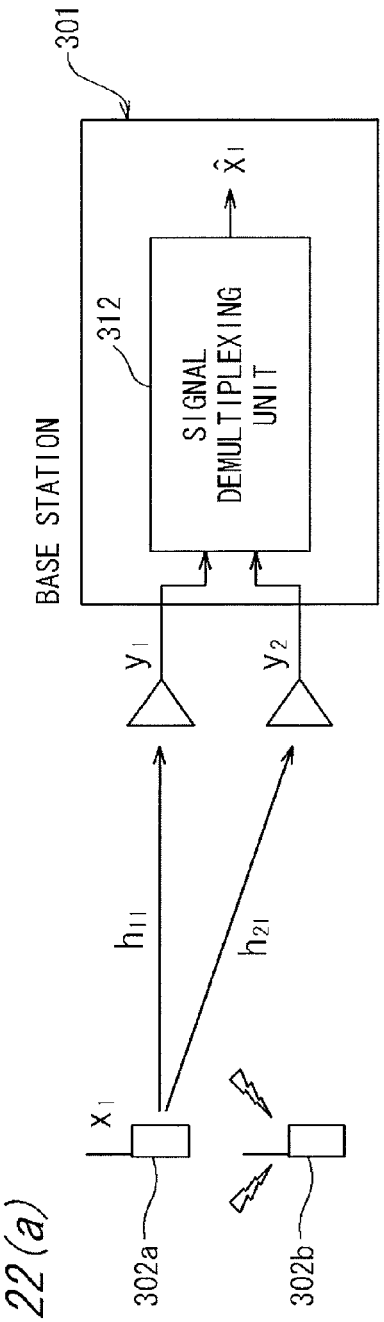
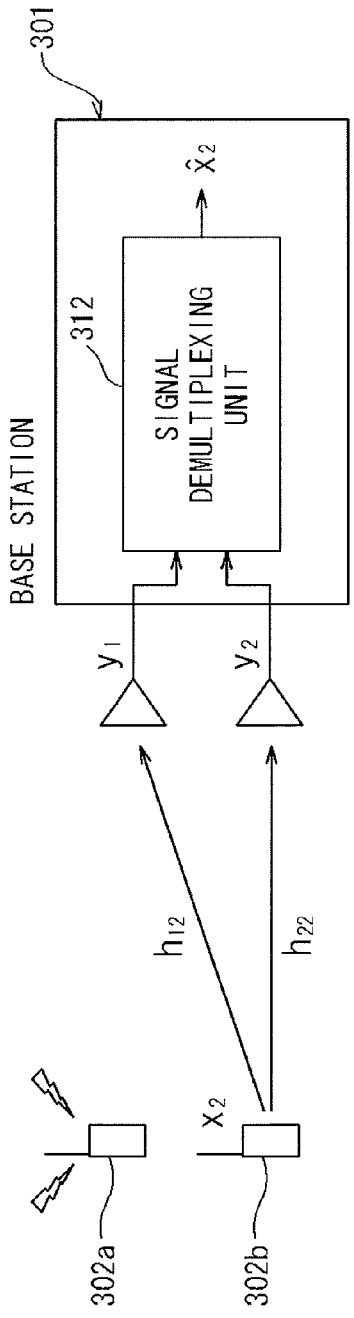
FIG. 22(a)
FIG. 22(b)

COMMUNICATION APPARATUS AND BASE STATION APPARATUS

TECHNICAL FIELD

The present invention relates to a communication apparatus and a base station apparatus.

BACKGROUND ART

Conventionally, there is a radio communication system including base station apparatuses and mobile terminal apparatuses connected by radio to the base station apparatuses. Each of the base station apparatuses forms a coverage area (cell) where the base station apparatus can communicate with terminal apparatuses. The terminal apparatuses located in the cell can perform radio communication with the base station apparatus forming the cell (see, for example, Patent Literature 1).

In the above-described radio communication system, when coverage areas (cells) set by a respective plurality of base station apparatuses overlap with each other, a signal transmitted from a base station apparatus may reach a terminal apparatus in a cell of another base station apparatus near the base station apparatus and thus become an interference signal to the terminal apparatus.

Furthermore, the above-described radio communication system includes, as base station apparatuses, for example, a macro base station apparatus that forms a cell (macrocell) of several kilometers in size; and a femto base station apparatus that is installed in the macrocell and forms a relatively small cell (femtocell) of the order of several tens of meters in the macrocell. In this radio communication system, since substantially the entire area of the femtocell formed by the femto base station apparatus overlaps with the macrocell, it can be said that this environment easily causes interference therebetween.

For the methods of suppressing interference waves under such an environment, measures such as keeping the transmission power on the interference giving side at a low level and removing interference waves by a multi-antenna system are considered.

Of them, for the method of removing interference waves by a multi-antenna system, as shown in the following Patent Literature 2, the application of which is filed by the inventors of the present invention, there is a method in which a weight is calculated on a per minimum unit of radio resource allocation basis, whereby a weight is calculated based only on signals received from the same user. According to this method, since the number of interfering sources in the minimum unit is limited, an appropriate weight can be obtained and thus removal of interference waves can be effectively performed.

CITATION LIST

Patent Literature

Patent Literature 1: Japanese Unexamined Patent Publication No. 2009-177532
Patent Literature 2: Japanese Patent Application No. 2009-245337

Non-Patent Literature

Non-Patent Literature 1: Takeshi Hattori, "OFDM/OFDMA Textbook", 1st edition, Impress R&D, 2008, pp. 310-312 and pp. 329

SUMMARY OF INVENTION

Technical Problem

In the method described in the above-described Patent Literature 2, although removal of interference waves can be effectively performed, there is a need to perform estimation of a correlation matrix for determining a weight on the per minimum unit basis and a computation of an inverse matrix thereto, and thus, there is a problem that the computation load is relatively large.

An object of the present invention in terms of the above-described viewpoint (first viewpoint) is therefore to provide a communication apparatus capable of effectively removing interference waves from a received signal while reducing the computation load.

Meanwhile, in communication standards such as LTE (Long-Term Evolution), in uplink scheduling from user terminals to a base station apparatus, spatial division multiplexing scheduling is performed in addition to time and frequency domain scheduling.

Spatial division multiplexing scheduling is performed by multi-user MIMO (Multiple Input Multiple Output) where the same frequency domain is allocated to a plurality of user terminals at the same time. For example, in spatial division multiplexing scheduling in LTE, the same resource block (RB; a minimum unit of resource allocation to users) is allocated to a plurality user terminals at the same time.

When multi-user MIMO is performed in LTE uplink, reference signals of a plurality of user terminals are transmitted by code multiplexing using cyclic shifts. Signals simultaneously transmitted from the plurality of user terminals are received by a base station apparatus as a multiplexed signal. The base station apparatus demultiplexes the received multiplexed signal into signals for the respective user terminals and uses the signals for channel estimation for the respective user terminals (see, for example, Non-Patent Literature 1).

In order to demultiplex a reference signal which is code-multiplexed by cyclic shifts, the base station apparatus normally transforms a channel frequency response of the multiplexed reference signal into time domain by an IDFT (Inverse Discrete Fourier Transform). Thereafter, the base station apparatus separates the channel time response into channel time responses for the respective users using a window function and performs a DFT (Discrete Fourier Transform) on the separated channel time responses for the respective users to transform again the channel time responses into frequency domain signals, and thereby estimates channel characteristics for the respective users.

However, channel characteristics estimated by demultiplexing a multiplexed signal by the above-described method have a problem that distortion is likely to occur at both ends of the band. The reason for this is as follows. Specifically, when a transfer coefficient of a multiplexed reference signal is transformed into time domain by an IDFT, since a finite number of data is cut out and periodically extended, data are discontinuous at the boundaries of extended portions and thus higher-order coefficients are likely to occur. As a result, it is considered that delay spread of data after being transformed into time domain increases. When delay spread of data thus increases, upon demultiplexing the data into data for the respective users using a window function thereafter, spread of the data becomes larger than the window width, which causes a loss in data outside the window width. Thus, it is considered that distortion occurs in estimation channel characteristics.

When, as described above, distortion occurs at both ends of the band of an estimated channel characteristic, a demodulation process using the channel characteristic may be adversely affected and thus a technique capable of suppressing such distortion and further increasing channel estimation accuracy is sought.

An object of the present invention in terms of the above-described viewpoint (second viewpoint) is therefore to provide a communication apparatus capable of suitably demultiplexing a multiplexed reference signal and further increasing channel estimation accuracy.

In addition, as described previously, when multi-user MIMO is performed in LTE uplink, reference signals from a plurality of user terminals are multiplexed using code multiplexing. As shown in FIG. 26, signals $x_1$ and $x_2$ simultaneously transmitted from a plurality of user terminals become spatially multiplexed signals. The spatially multiplexed signals are received by a plurality of receiving antennas in a base station apparatus and are demultiplexed into signals from the respective user terminals.

For general methods of demultiplexing a spatially multiplexed signal, there are linear demultiplexing and maximum likelihood estimation such as Zero-Forcing (ZF) and Minimumu Mean Square Error (MMSE).

In LTE, by using, for reference signals (pilots), different cyclic shifts for different user terminals, orthogonality between the user terminals is ensured and spatial division multiplexing is implemented. Therefore, in the base station apparatus, by estimating a channel matrix H, the received spatially multiplexed signals can be demultiplexed and estimated values of the transmitted signals $x_1$ and $x_2$ from the user terminals can be obtained.

Demultiplexing of spatially multiplexed signals by the above-described demultiplexing method requires the estimation of a channel matrix H. For this, orthogonality (orthogonal) between reference signals (pilots) from the spatially multiplexed user terminals is required.

Therefore, as also described in Non-Patent Literature 1, in spatial division multiplexing scheduling, completely the same RB needs to be allocated to a plurality of user terminals to be spatially multiplexed.

Due to the constraint that completely the same RB needs to be allocated to a plurality of user terminals to be spatially multiplexed, a problem of low flexibility in resource allocation upon spatial division multiplexing arises.

Specifically, as shown in FIG. 27, user 2 spatially multiplexed with user 1 needs to be allocated completely the same frequency (RB) as the user 1, and user 6 spatially multiplexed with user 5 also needs to be allocated completely the same frequency (RB) as the user 5. Such a constraint decreases flexibility in resource allocation when performing spatial division multiplexing scheduling.

An object of the present invention in terms of the above-described viewpoint (third viewpoint) is therefore to increase flexibility in resource allocation when performing spatial division multiplexing scheduling.

Solution to Problem

The inventors of the present invention have devoted themselves to studies to obtain a communication apparatus capable of effectively removing interference waves from a received signal while reducing the computation load. In the course of the studies, the inventors focus attention on the following points. For example, as in SC-FDMA adopted in LTE uplink, when allocating a minimum unit of radio resource allocation, if a communication scheme is such that a plurality of minimum units arranged consecutively are allocated to a single user, then it is highly likely that there is a correlation between minimum units adjacent to each other in a direction in which the plurality of minimum units allocated to the single user are arranged consecutively. In addition, for an interference wave from a communication apparatus which is an interfering source, too, likewise, it is highly likely that there is a correlation between minimum units adjacent to each other. Hence, there is a possibility that a plurality of minimum units correlated with each other, including an influence by an interference wave, may be present consecutively. That is, the inventors have found the following fact and arrived at the present invention. Specifically, with a communication scheme such as that described above, without calculating a weight on a per minimum unit basis, by performing weight calculation along a direction in which a plurality of minimum units allocated to a single user are arranged consecutively, by a sequential update type calculation method regardless of a user allocation state, weights with high accuracy that allow effective removal of interference waves can be obtained for each correlated region.

(1) That is, a first aspect of the present invention provides a communication apparatus including a weight calculating unit that calculates weights of a respective plurality of known signals included in a received signal, by a calculation method where a sequential update is performed on a per known signal basis, wherein the weight calculating unit includes a calculating unit that calculates a plurality of weights including at least a first weight and a second weight of a target known signal being an update target, the first weight being obtained by updating, using the target known signal, a weight of a first another known signal updated immediately before performing an update using the target known signal, and the second weight being obtained by updating, using the target known signal, a weight of a second another known signal different than the first another known signal; and a selecting unit that selects one of the plurality of weights of the target known signal having a lower estimation error, as a weight of the target known signal. According to the above-described present invention, while reducing computation load, the interference wave can be effectively removed from a received signal.

(2) More specifically, it is preferred that the calculating unit select a plurality of predetermined regions in a plurality of orders including at least a first order and a second order different than the first order, each of the plurality of predetermined regions consisting of one or a plurality of minimum units of radio allocation and at least calculate, every time a predetermined region is selected in the first order, a first weight using a known signal included in the selected predetermined region, and calculate, every time a predetermined region is selected in the second order, a second weight using a known signal included in the selected predetermined region.

According to the communication apparatus having the above-described configuration, since the calculating unit in the weight calculating unit calculates a plurality of weights of the respective plurality of known signals by a calculation method where a sequential update is performed on a per known signal basis, there is no need to perform estimation of a correlation matrix for determining a weight on a per minimum unit basis and a computation thereof, as done in the above-described conventional example, and thus, the amount of computation thereof can be reduced, making it possible to reduce the computation load.

In addition, in the present invention, as described above, when receiving a signal transmitted by a scheme for allocating a plurality of consecutively arranged minimum units to a single user, there is a possibility that a plurality of minimum units correlated with each other, including an influence by an interference wave, may be present consecutively.

Hence, by the calculating unit suitably setting at least first and second orders different from each other among a plurality of orders which are the orders of selecting a predetermined region including known signals for calculating weights, both weights can be sequentially updated and calculated in a region where a plurality of correlated minimum units are present consecutively. As a result, in the region where a plurality of correlated minimum units are present consecutively, more known signals for use in sequential update can be obtained and thus values with a low estimation error and high accuracy can be obtained.

Furthermore, since the selecting unit selects, for each of a plurality of known signals, one of a plurality of weights of a target known signal that has a lower estimation error, as a weight of the known signal, the weight calculating unit can obtain weights with high accuracy for the known signals for each region where a plurality of correlated minimum units are present consecutively.

By the above, according to the present invention, while reducing the computation load, weights with high accuracy of known signals can be obtained and thus interference waves can be effectively removed from a received signal.

(3) In addition, since the calculating unit calculates, every time a predetermined region is selected in the first order, a first weight using a known signal included in the selected predetermined region, and calculates, every time a predetermined region is selected in the second order, a second weight using a known signal included in the selected predetermined region. Thus, it is preferred that the second order be reverse order to the first order. In this case, a first weight and a second weight which are updated in the opposite orders of selecting a predetermined region can be obtained, and thus, the selecting unit can obtain weights with higher accuracy of known signals.

(4) (5) It is preferred that each of the predetermined regions be a region that can be identified as being allocated to a same user, without referring to user allocation information. In this case, by selection of a predetermined region, a region where a plurality of correlated minimum units are present consecutively can be captured over a wide range without referring to user allocation information. Note that it is preferred that each of the minimum units of radio allocation be a resource block.

(6) (7) It is preferred that the first and second orders be orders in which the predetermined regions are arranged along at least one of a frequency direction and a time direction. Furthermore, it is preferred that the target known signal, the first another known signal, and the second another known signal be arranged along at least one of a frequency direction and a time direction.

In this case, the calculating unit can suitably set the first and second orders and an arrangement of the first another known signal and the second another known signal such that weights with high accuracy can be obtained according to a received signal.

(8) (9) It is preferred that the received signal received by the communication apparatus be a signal to be transmitted by a scheme for allocating a plurality of consecutively arranged minimum units to a single user. More specifically, it is preferred that the scheme for allocating a plurality of consecutively arranged minimum units to a single user be an SC-FDMA scheme.

In the case of the SC-FDMA scheme, due to the scheme, since a plurality of minimum units arranged consecutively in the frequency direction are allocated to a single user, it is highly likely that minimum units arranged consecutively along the frequency direction have a correlation and thus the weight calculating unit can suitably calculate weights of known signals along the frequency direction.

(10) A second aspect of the present invention provides a communication apparatus including a channel estimating unit that estimates, from a received multiplexed signal where a plurality of reference signals are multiplexed by cyclic shifts, channel characteristics of a plurality of received signals respectively including the plurality of reference signals, wherein the channel estimating unit estimates the channel characteristics of the respective plurality of received signals based on a channel time response of the received multiplexed signal obtained by performing a discrete cosine transform on a channel frequency response of the received multiplexed signal. According to the above-described invention, a multiplexed reference signal can be suitably demultiplexed and thus channel estimation accuracy can be further increased.

(11) More specifically, it is preferred that the channel estimating unit include a first transforming unit that performs a discrete cosine transform on the channel frequency response of the received multiplexed signal and thereby obtains the channel time response of the received multiplexed signal, a windowing process unit that separates the channel time response of the received multiplexed signal into channel time responses of the respective plurality of reference signals, and second transforming units that perform an inverse discrete cosine transform on the separated channel time responses of the respective plurality of reference signals, and thereby obtain channel frequency responses of the respective plurality of reference signals, and estimate the channel characteristics of the respective plurality of received signals based on the channel frequency responses of the respective plurality of reference signals.

According to the communication apparatus having the above-described configuration, since the first transforming unit in the channel estimating unit transforms a channel frequency response of a received multiplexed signal into a channel time response by a discrete cosine transform, the occurrence of a discontinuous portion of data upon periodic extension, which is seen in an IDFT in the above-described conventional example, can be prevented and thus delay spread occurring in channel time responses of the respective plurality of reference signals in the channel time response of the received multiplexed signal can be prevented from increasing. Hence, data loss occurring when separating a channel time response into channel time responses of the respective plurality of reference signals by the windowing process unit can be suppressed. As a result, the occurrence of distortion in channel characteristics to be estimated can be suppressed, making it possible to increase channel estimation accuracy.

(12) The second aspect of the present invention provides a communication apparatus including a channel estimating unit that estimates, from a received multiplexed signal where a plurality of reference signals are multiplexed by cyclic shifts, channel characteristics of a plurality of received signals respectively including the plurality of reference signals, wherein the channel estimating unit estimates the channel characteristics of the respective plurality of received signals based on processed functions obtained by performing an even symmetric extension process on a channel frequency response of the received multiplexed signal.

(13) More specifically, it is preferred that the channel estimating unit include multiplication units that multiply the channel frequency response of the received multiplexed signal by complex constants obtained based on cyclic shifts of the respective plurality of reference signals, and thereby obtain, for the respective plurality of reference signals, channel frequency responses of the received multiplexed signal where channel frequency responses of the plurality of reference signals are shifted to their respective original frequencies, extension processing units that perform an even symmetric extension process on the channel frequency responses of the received multiplexed signal where the channel frequency responses of the plurality of reference signals are shifted to their respective original frequencies, and thereby obtain the processed functions for the respective plurality of reference signals, and filter units that obtain only the channel frequency responses of the plurality of reference signals shifted to their respective original frequencies, from their corresponding processed functions for the respective plurality of reference signals, and estimate the channel characteristics of the respective plurality of received signals based on the channel frequency responses of the plurality of reference signals.

According to the communication apparatus having the above-described configuration, since the extension processing units in the channel estimating unit perform an even symmetric extension process on a channel frequency response of a received multiplexed signal, data loss occurring when the filter units separate and obtain channel frequency responses of a plurality of reference signals can be suppressed. As a result, the occurrence of distortion in channel characteristics to be estimated can be suppressed, making it possible to increase channel estimation accuracy.

In addition, in the communication apparatus of the present invention, since channel frequency responses of the respective plurality of reference signals are obtained in the frequency domain, there is no need to perform a process with a large amount of computation such as an IDFT, making it possible to achieve a configuration in which the load on the apparatus can be reduced.

(14) It is preferred that each of the plurality of extension processing units perform extension on a frequency axis before and after a corresponding channel frequency response of the multiplexed signal where the channel frequency response of a corresponding reference signal is shifted to its original frequency, by a length corresponding to a length of group delay of a corresponding filter unit. In this case, while performing extension with the minimum necessary amount of data, data loss caused by the filter unit can be more effectively suppressed.

(15) Furthermore, since a channel time response obtained by a filter unit includes delay components occurring as a result of passing through the filter unit, it is preferred that the channel estimating unit further include a plurality of removing units that remove delay components occurring in the channel frequency response portions of the plurality of reference signals obtained by the plurality of filter units. By this, channel time responses of the respective plurality of reference signals can be obtained more accurately.

(16) The second aspect of the present invention provides a communication apparatus including a channel estimating unit that estimates, from a received multiplexed signal where a plurality of reference signals are multiplexed by cyclic shifts, channel characteristics of a plurality of received signals respectively including the plurality of reference signals, wherein the channel estimating unit estimates the channel characteristics of the respective plurality of received signals by performing a process based on even symmetry on a channel frequency response of the received multiplexed signal.

According to the communication apparatus having the above-described configuration, since the channel estimating unit performs a process based on even symmetry on a channel frequency response of a received multiplexed signal, data loss occurring when separating and obtaining channel frequency responses of a plurality of reference signals from the channel frequency response obtained after the process can be suppressed. As a result, the occurrence of distortion in channel characteristics to be estimated can be suppressed, making it possible to increase channel estimation accuracy.

(17) The second aspect of the present invention provides a communication apparatus including a channel estimating unit that estimates, from a received multiplexed signal where a plurality of reference signals are multiplexed by cyclic shifts, channel characteristics of a plurality of received signals respectively including the plurality of reference signals, wherein the channel estimating unit includes, multiplication units that multiply a channel frequency response of the received multiplexed signal by complex constants obtained based on cyclic shifts of the respective plurality of reference signals, and thereby obtain, for the respective plurality of reference signals, channel frequency responses of the received multiplexed signal where channel frequency responses of the plurality of reference signals are shifted to their respective original frequencies, and filter units that obtain only the channel frequency responses of the plurality of reference signals shifted to their respective original frequencies, from their corresponding channel frequency responses of the received multiplexed signal where the channel frequency responses of the plurality of reference signals are shifted to their respective original frequencies, and estimates the channel characteristics of the respective plurality of received signals based on the channel frequency responses of the plurality of reference signals.

According to the communication apparatus having the above-described configuration, since channel frequency responses of a respective plurality of reference signals are obtained in the frequency domain, there is no need to perform a process with a large amount of computation such as an IDFT, making it possible to achieve a simple configuration.

(18) A third aspect of the present invention provides a base station apparatus including a scheduling unit capable of performing a spatial division multiplexing scheduling process on a plurality of user terminals, the base station apparatus including, a signal demultiplexing unit that demultiplexes a spatially multiplexed signal into signals from the respective user terminals, wherein the signal demultiplexing unit is configured to perform an adaptive array process on a spatially multiplexed signal, regarding, as a desired signal, a signal from a user terminal to be demultiplexed and extracted and regarding, as an interference signal, a signal from another user terminal spatially multiplexed with the desired signal, and thereby obtain signals from the respective user terminals.

According to the above-described invention, an adaptive array process is performed on a spatially multiplexed signal, regarding, as a desired signal, a signal from a user terminal to be demultiplexed and extracted and regarding, as an interference signal, a signal from another user terminal spatially multiplexed with the desired signal, whereby signals from the respective user terminals can be obtained. In this case, a pilot signal from that another user terminal is not required. Therefore, there is no constraint that completely the same resource (frequency) needs to be allocated to a plurality of user terminals to be spatially multiplexed, increasing flexibility in resource allocation.

(19) The base station apparatus is preferably a femtocell base station apparatus. Since a femtocell is relatively small, there are very little multipath and delay and thus conditions suitable to perform an adaptive array process on a spatially multiplexed signal are easily obtained.

(20) The signal demultiplexing unit can perform a weight computation for the adaptive array process, using pilot signals whose amounts of cyclic shift are set for each of the plurality of user terminals such that a cross-correlation between the pilot signals is smaller than a predetermined threshold value between the plurality of user terminals. In this case, orthogonality between pilot signals can be ensured and thus pilot signals from a plurality of spatially multiplexed user terminals can be distinguished from each other.

(21) It is preferred that the adaptive array process be performed using a weight computed on a per minimum unit of resource allocation to users basis. Since the another user terminal that transmits a signal regarded as an interference signal is invariant in a minimum unit of resource allocation to users, an appropriate adaptive array process can be performed.

(22) It is preferred that a determining unit that determines whether signal demultiplexing by the adaptive array process can be performed be provided. By determining whether signal demultiplexing by the adaptive array process can be performed, the case in which demultiplexing cannot be performed can be handled.

(23) It is preferred that the determining unit determine whether signal demultiplexing by the adaptive array process can be performed, by determining whether there is an interfering terminal. When there is an interfering terminal, it is difficult to perform signal demultiplexing by the adaptive array process. Thus, by making such a determination, such a case can be handled.

(24) It is preferred that the determining unit determines whether signal demultiplexing can be performed, based on a result of an attempt to perform signal demultiplexing by the adaptive array process. By making such a determination, the case in which demultiplexing cannot be performed can be handled.

(25) When it is determined by the determining unit that signal demultiplexing cannot be performed, the scheduling unit performs a scheduling process not using spatial division multiplexing or performs another spatial division multiplexing scheduling process. By this, the case in which demultiplexing cannot be performed can be appropriately handled.

BRIEF DESCRIPTION OF DRAWINGS

FIG. 8 is a diagram showing an example of the case in which the calculating unit and the selecting unit calculate weights of received reference signals in the state shown in FIG. 7, and (a) of FIG. 8 is a graph showing calculation results of estimation errors $e_{up}(i)$ for first weights $u_i$, (b) of FIG. 8 is a graph showing calculation results of estimation errors $e_{down}(i)$ for second weights $v_i$, and (c) of FIG. 8 is a graph showing an estimation error e for when the smaller one of the estimation errors for two weights is selected.

Figure 9A:
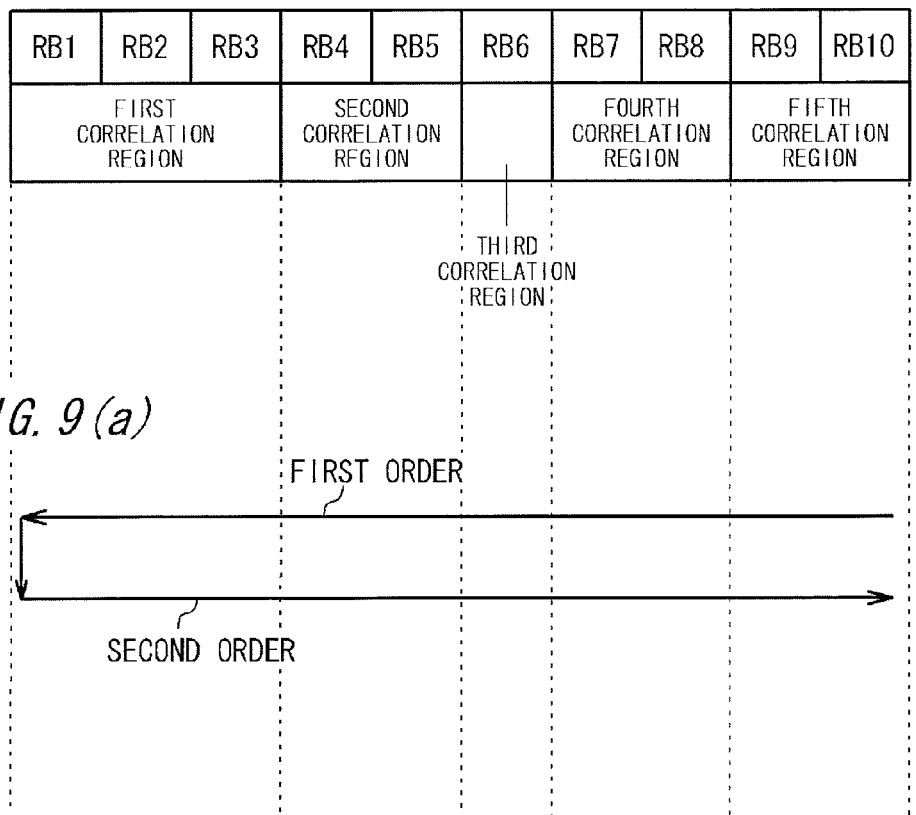
Figure 9B:
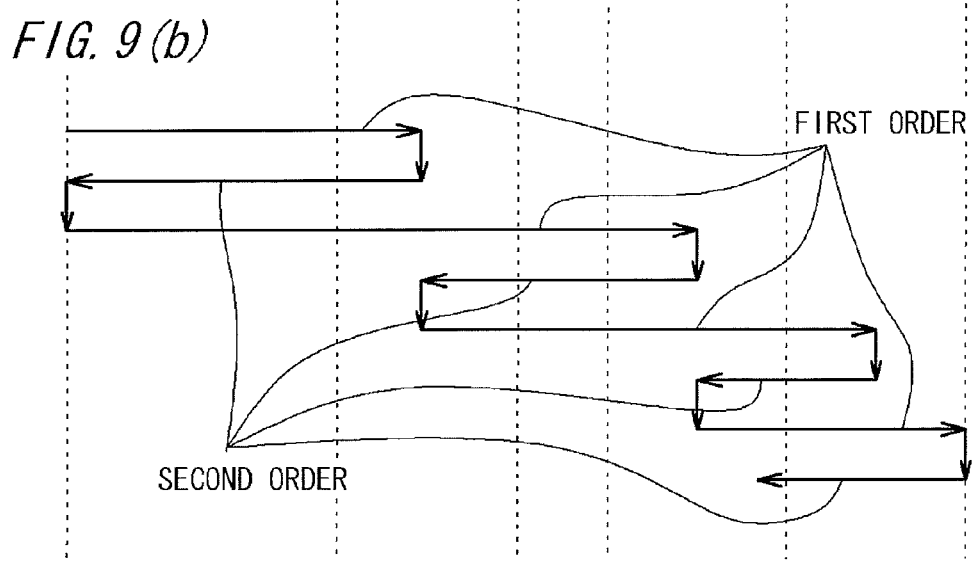

(a) of FIG. 9 is a diagram showing another mode of an update direction for received reference signals when the calculating unit calculates weights of the received reference signals, and (b) of FIG. 9 is a diagram showing another mode different than that in (a) of FIG. 9.

FIG. 10 is a diagram showing a mode of an update direction for received reference signals when the calculating unit calculates weights of the received reference signals, for when a sequential update is performed in a frequency direction and a time direction.

FIG. 11 is a schematic diagram showing a configuration of a radio communication system of an LTE scheme.

FIG. 12 is a block diagram showing a configuration of a principal part of a reception system of a base station apparatus.

Figure 13:
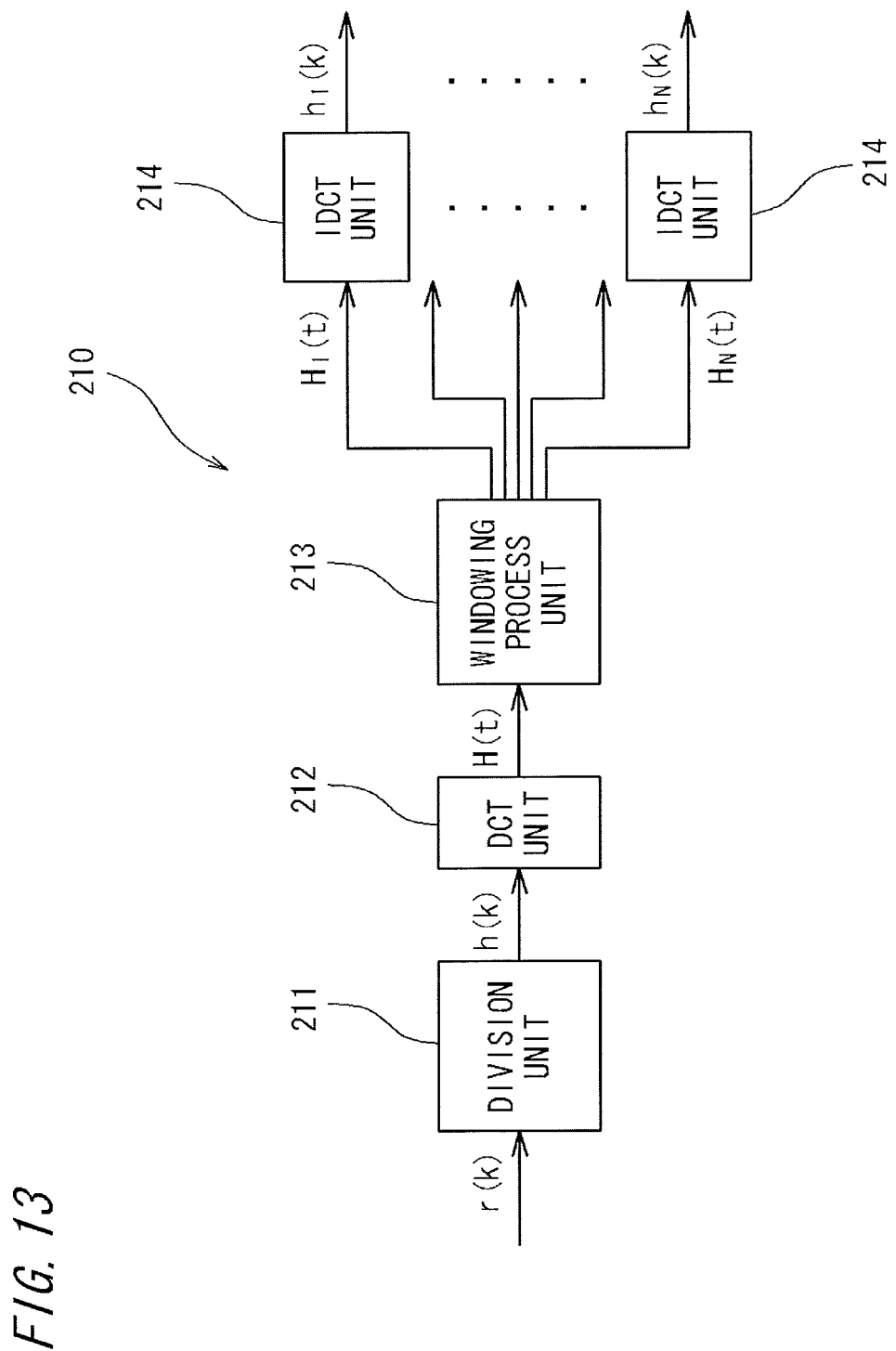

FIG. 13 is a block diagram showing a configuration of a channel estimating unit.

Figure 14A:
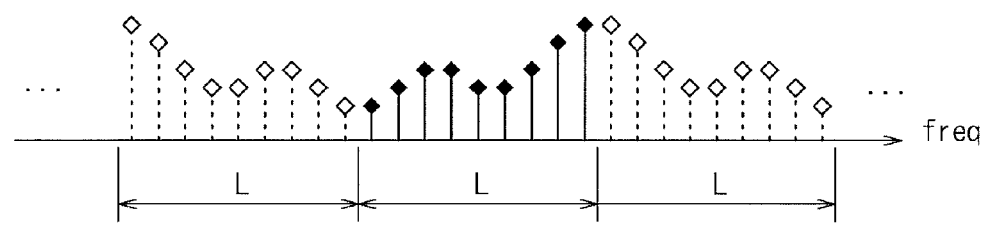
Figure 14B:
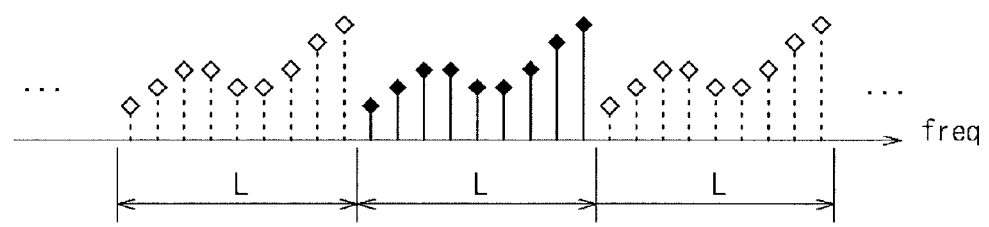

FIG. 14 is a diagram for describing a mode of periodic extension by a discrete cosine transform, and (a) of FIG. 14 shows the case of a discrete cosine transform and (b) of FIG. 14 shows the case of an IDFT.

Figure 15A:
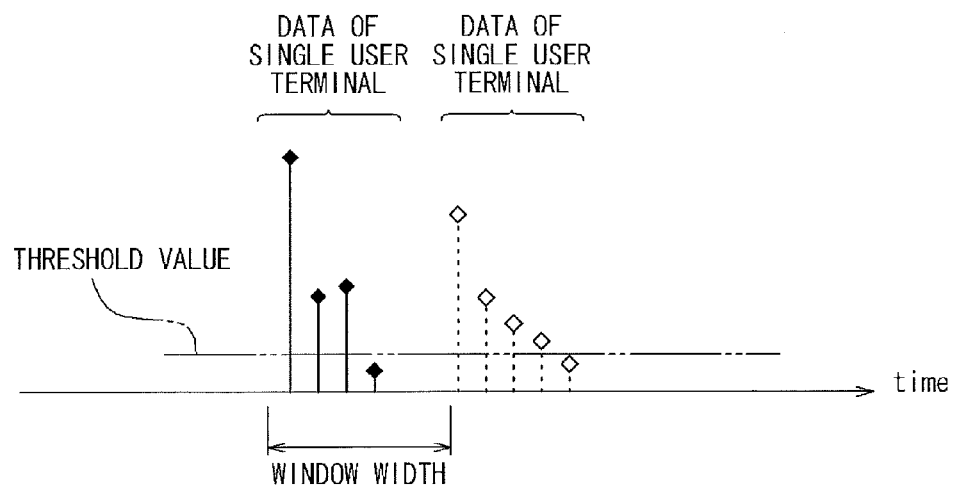
Figure 15B:
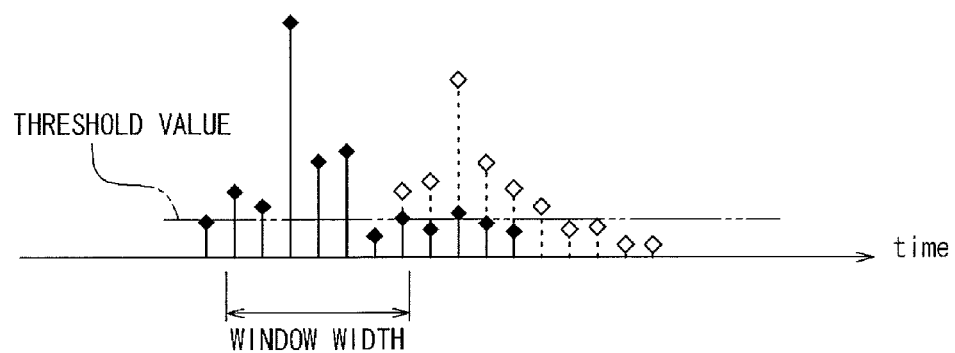

FIG. 15 is a diagram for describing a mode for when a channel frequency response is transformed into time domain, and (a) of FIG. 15 shows an example of the case of a discrete cosine transform and (b) of FIG. 15 shows an example of the case of an IDFT.

Figure 16:
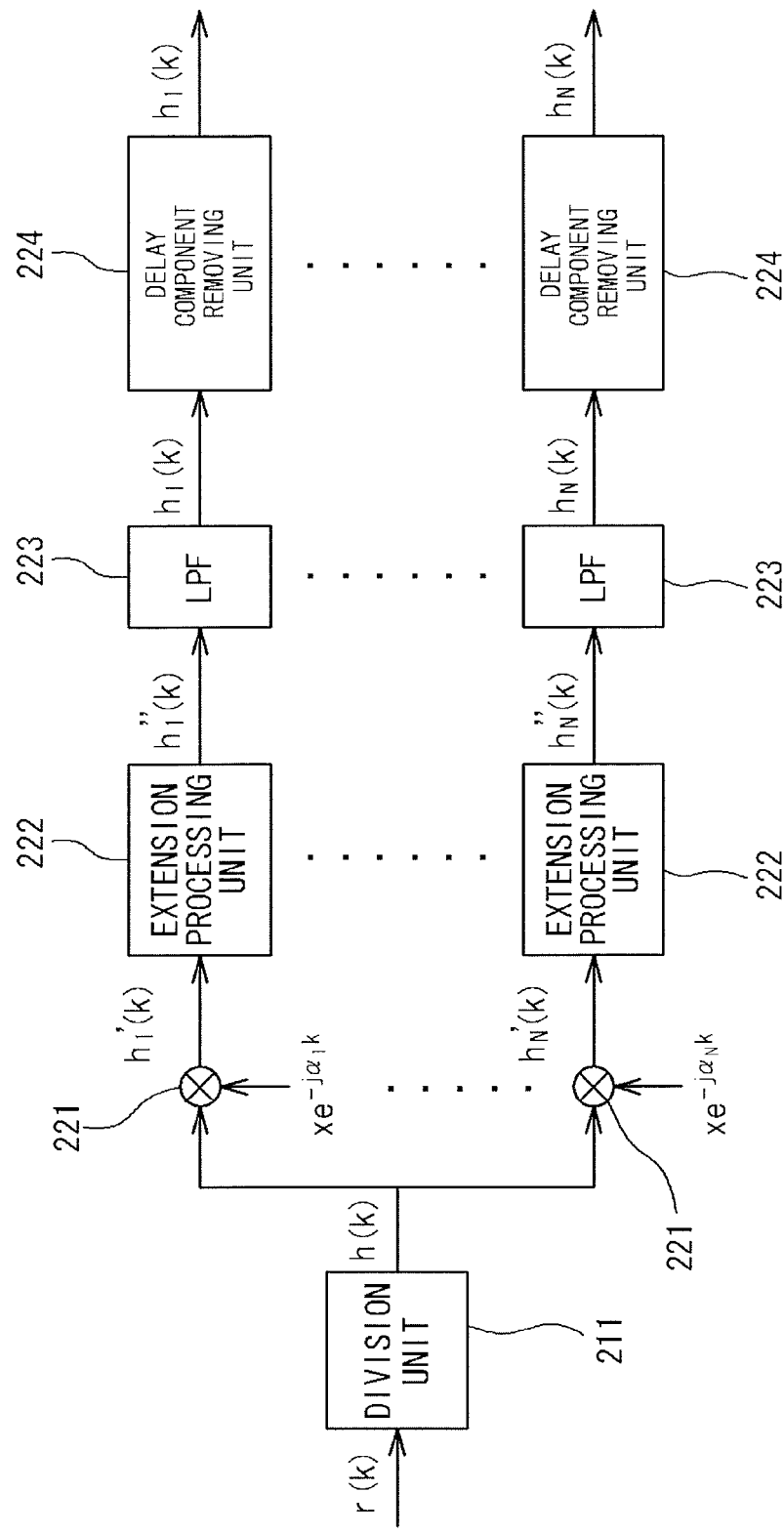

FIG. 16 is a block diagram showing a configuration of a channel estimating unit included in a base station apparatus according to a second embodiment of the present invention.

Figure 17A:
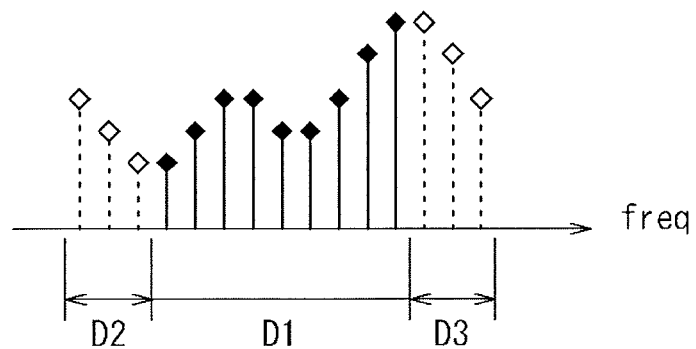
Figure 17B:
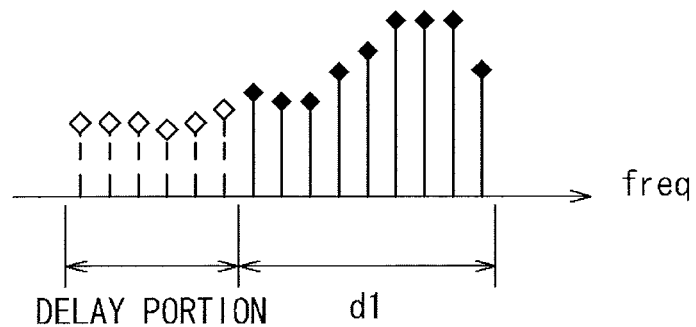

(a) of FIG. 17 is a diagram schematically showing an example of a processed function after performing an even symmetric extension process, and (b) of FIG. 17 is a schematic diagram showing a channel frequency response of a single user terminal obtained by an LPF unit.

FIG. 18 is graphs showing channel estimation results for implementation examples and a comparative example, and (a-1) and (a-2) of FIG. 18 are graphs showing channel estimation results for a first implementation example, (b-1) and (b-2) of FIG. 18 for a second implementation example, and (c-1) and (c-2) of FIG. 18 for the comparative example.

Figure 19A:
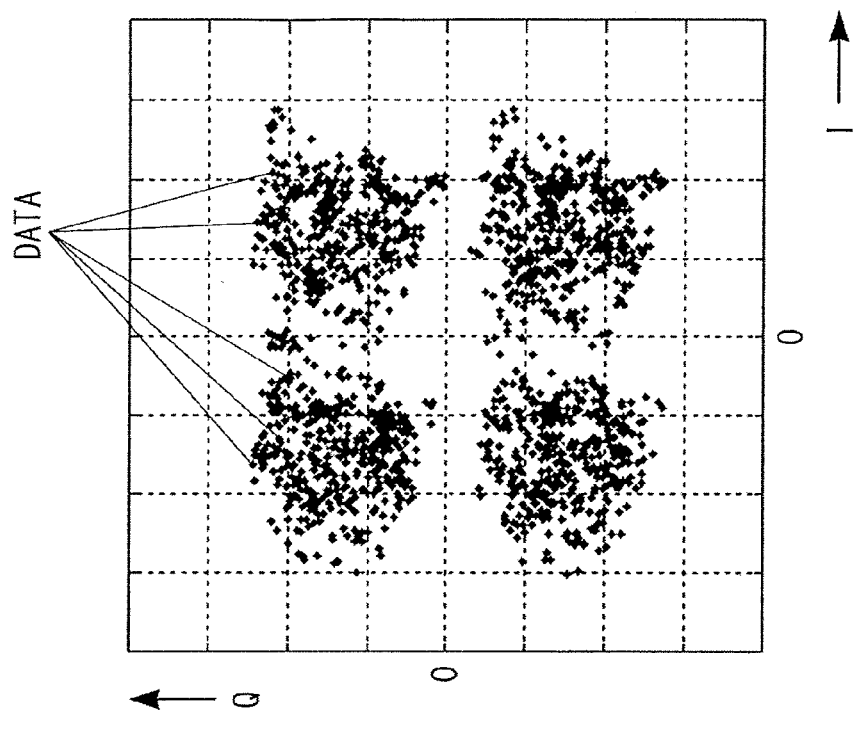
Figure 19B:
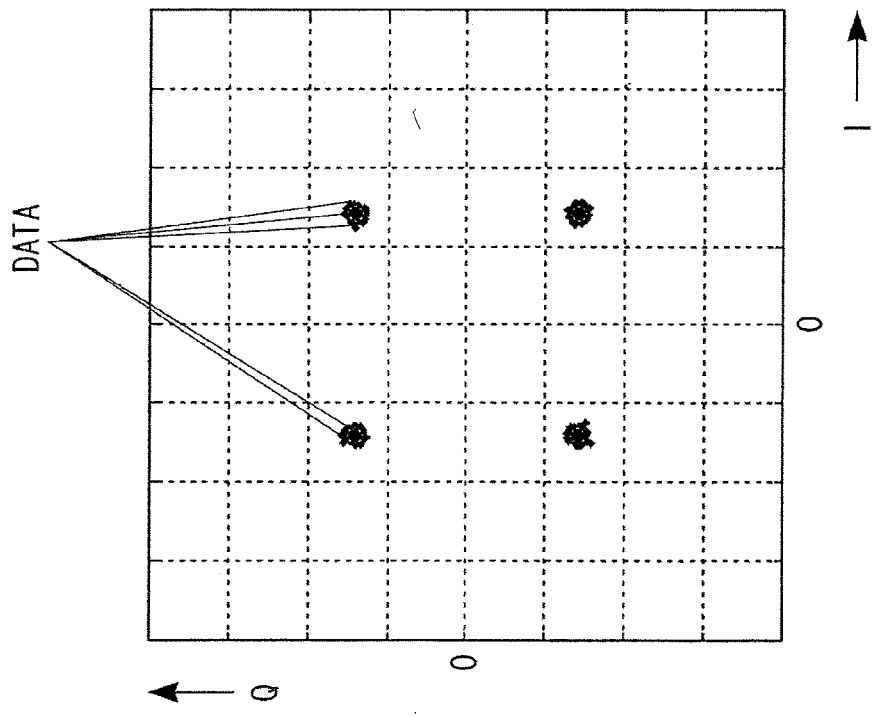

FIG. 19 shows an example of representations of data in constellation maps obtained being demodulated using the channel estimation results for the first implementation example and the comparative example which are verified by the simulation, and (a) of FIG. 19 shows a representation for the first implementation example and (b) of FIG. 19 shows a representation for the comparative example.

Figure 20:
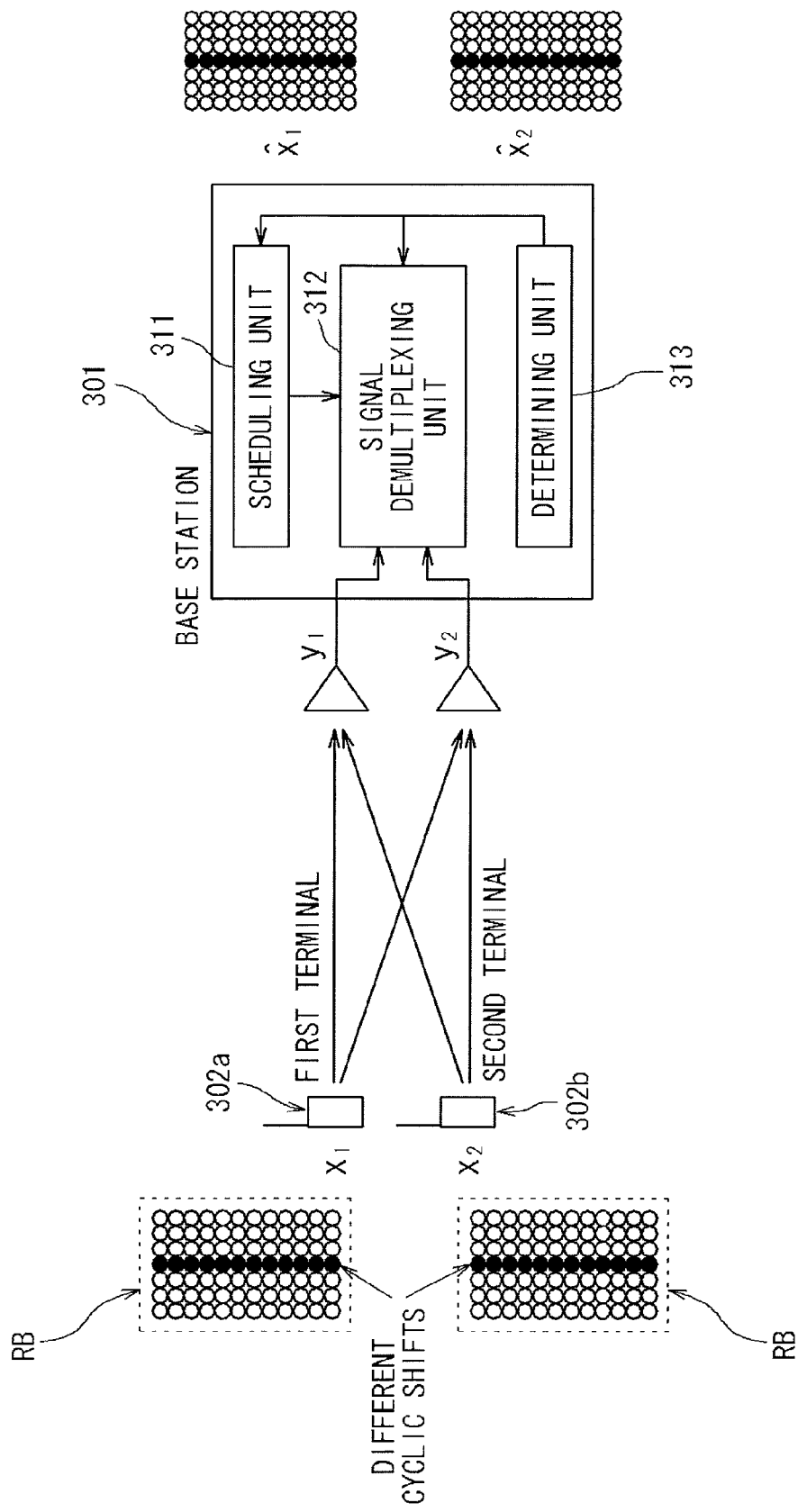

FIG. 20 is a configuration diagram of a radio communication system.

Figure 21:
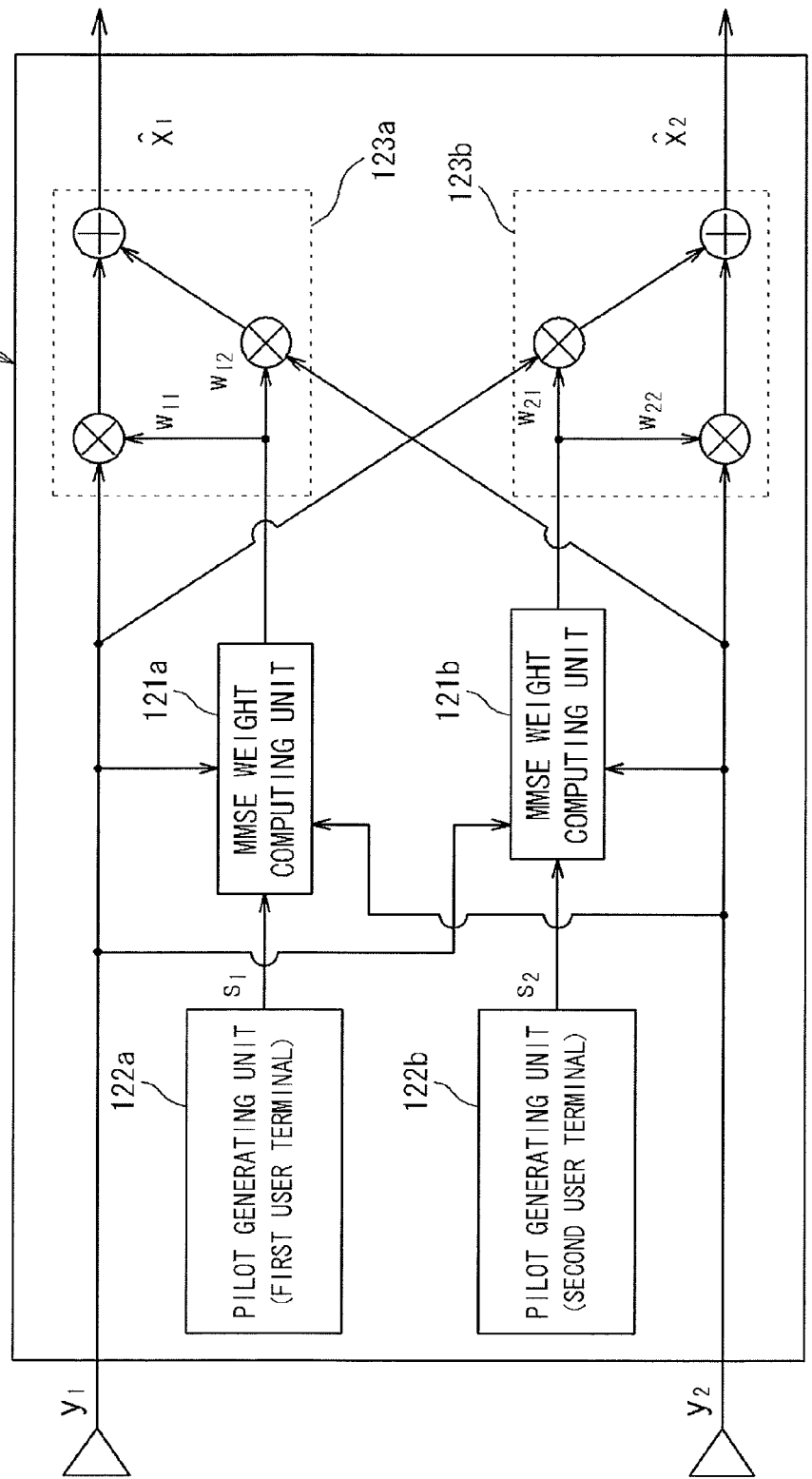

FIG. 21 is a block diagram of a signal demultiplexing unit.

FIG. 22 is a diagram describing how to perform signal demultiplexing by an adaptive array process.

Figure 23:
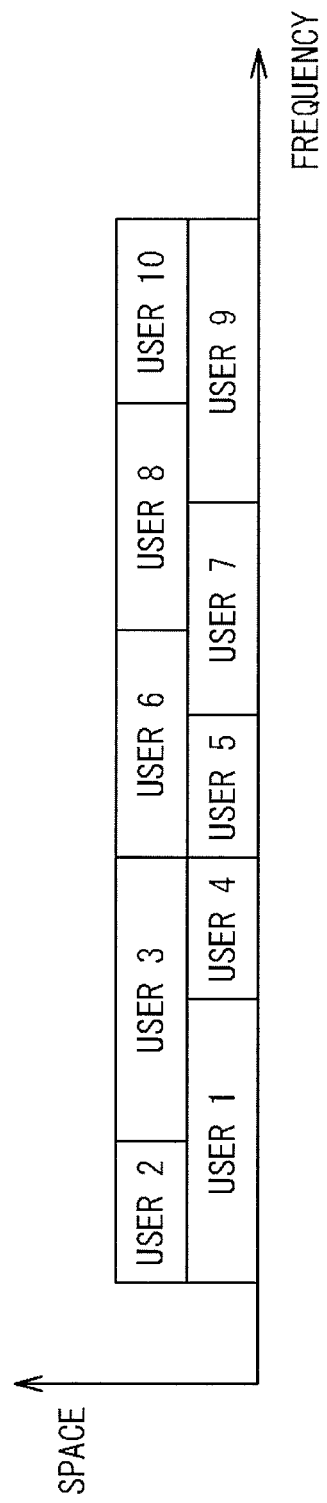

FIG. 23 is a diagram showing an example of spatial division multiplexing scheduling.

Figure 24:
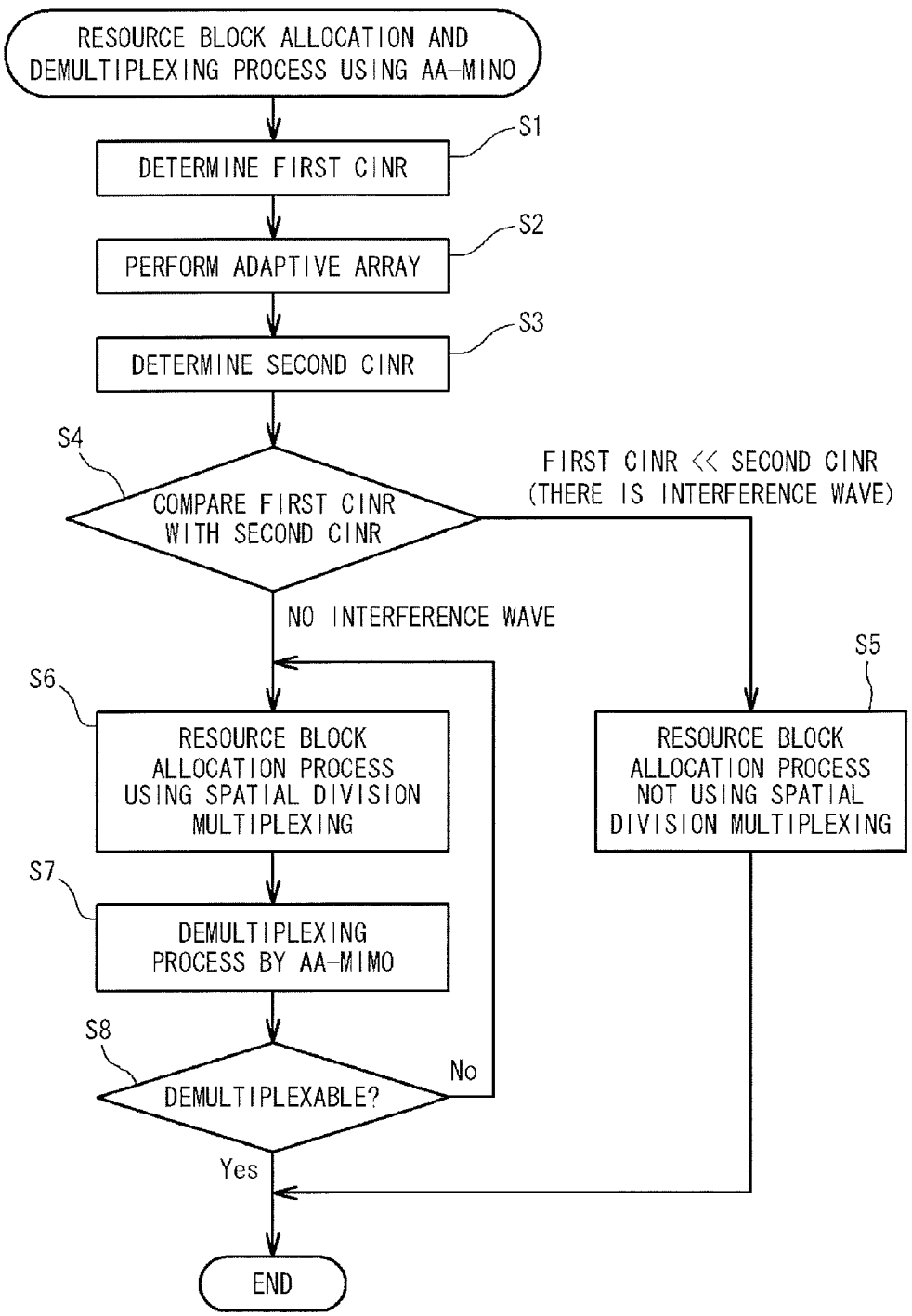

FIG. 24 is a flowchart of a process performed by a base station apparatus.

Figure 25:
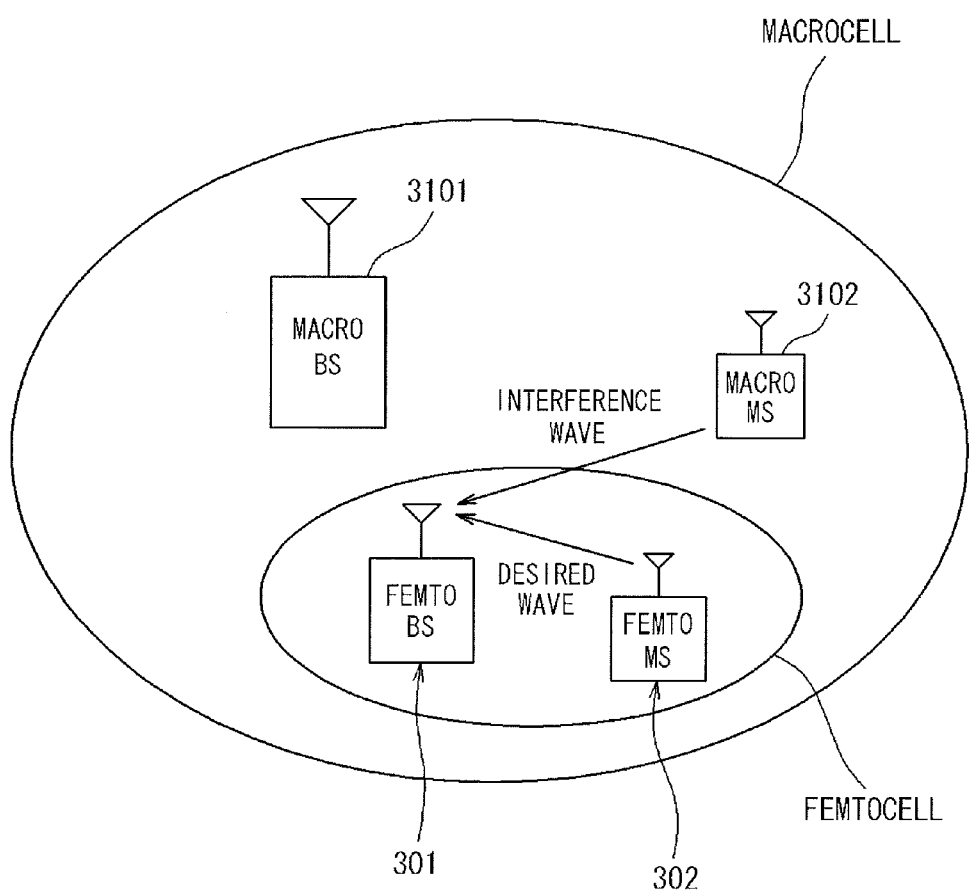

FIG. 25 is a diagram showing the presence of an interfering terminal in an essential sense.

Figure 26:
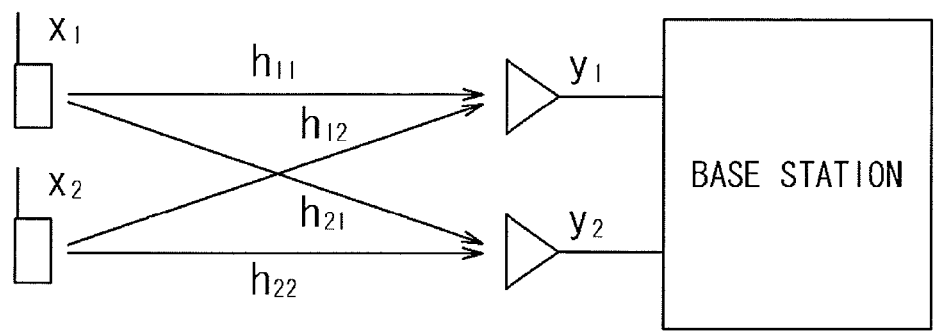

FIG. 26 is an illustrative diagram of a conventional signal demultiplexing method.

Figure 27:
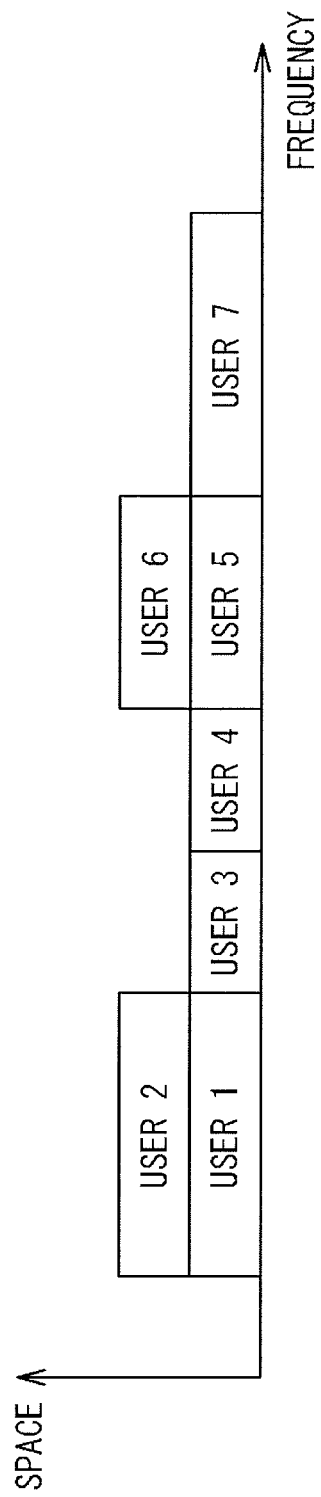

FIG. 27 is a diagram showing an example of conventional spatial division multiplexing scheduling.

DESCRIPTION OF EMBODIMENTS

Preferred embodiments of the present invention will be described below with reference to the accompanying drawings.

Chapter 1 Weight Calculation

In chapter 1, description is made using LTE (Long-Term Evolution) as an example of a communication scheme but the communication scheme is not limited thereto.

1.1 Configuration of a Communication System

Figure 1:
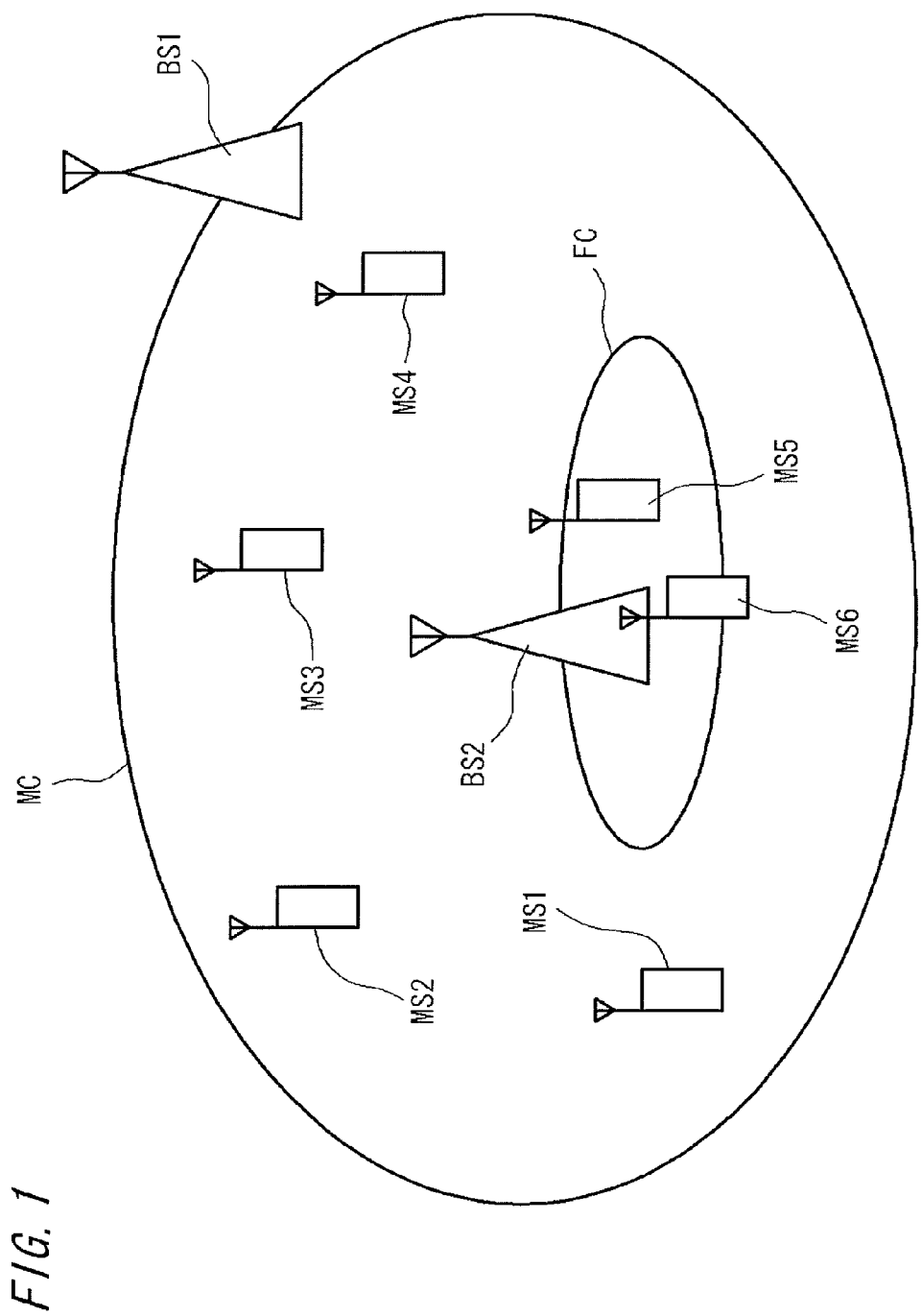
FIG. 1 is a schematic diagram showing a configuration of a radio communication system (e.g., a communication system for mobile phones) adopting an LTE scheme.

FIG. 1 is a schematic diagram showing a configuration of a radio communication system (e.g., a communication system for mobile phones) adopting an LTE scheme.

The radio communication system includes a plurality of base station apparatuses BS1 and BS2 and a plurality of mobile terminals (user terminals) MS1 to MS6 that can perform radio communication with the base station apparatus BS1.

The base station apparatus BS1 is configured as, for example, a plurality of macro base station apparatuses forming a coverage area (macrocell) MC of several kilometers in size, and the base station apparatus BS2 is configured as a femto base station apparatus installed in the macrocell MC and forming a relatively small femtocell FC of the order of several tens of meters.

The base station apparatus BS1 can perform radio communication with mobile terminals in the macrocell MC.

The base station apparatus BS2 is disposed in, for example, a location where it is difficult to receive radio waves from the macro base station apparatus, e.g., indoors, and forms the femtocell FC. The base station apparatus BS2 can perform radio communication with mobile terminals in the femtocell FC formed by the base station apparatus BS2 itself. In this system, even in a location where it is difficult to receive radio waves from the macro base station apparatus, etc., by installing the base station apparatus BS2 being a femto base station apparatus forming a relatively small femtocell FC in the location, services with sufficient throughput can be provided to mobile terminals.

In the radio communication system of the present embodiment, the downlink employs Orthogonal Frequency Division Multiple Access (OFDMA) and the uplink employs Single Carrier Frequency Division Multiple Access (SC-FDMA). Hence, the base station apparatuses BS1 and BS2 each have a transmitter circuit that supports an OFDMA scheme and a receiver circuit that supports an SC-FDMA scheme. The mobile terminals MS1 to MS6 each have a transmitter circuit that supports the SC-FDMA scheme and a receiver circuit that supports the OFDMA scheme.

Figure 2:
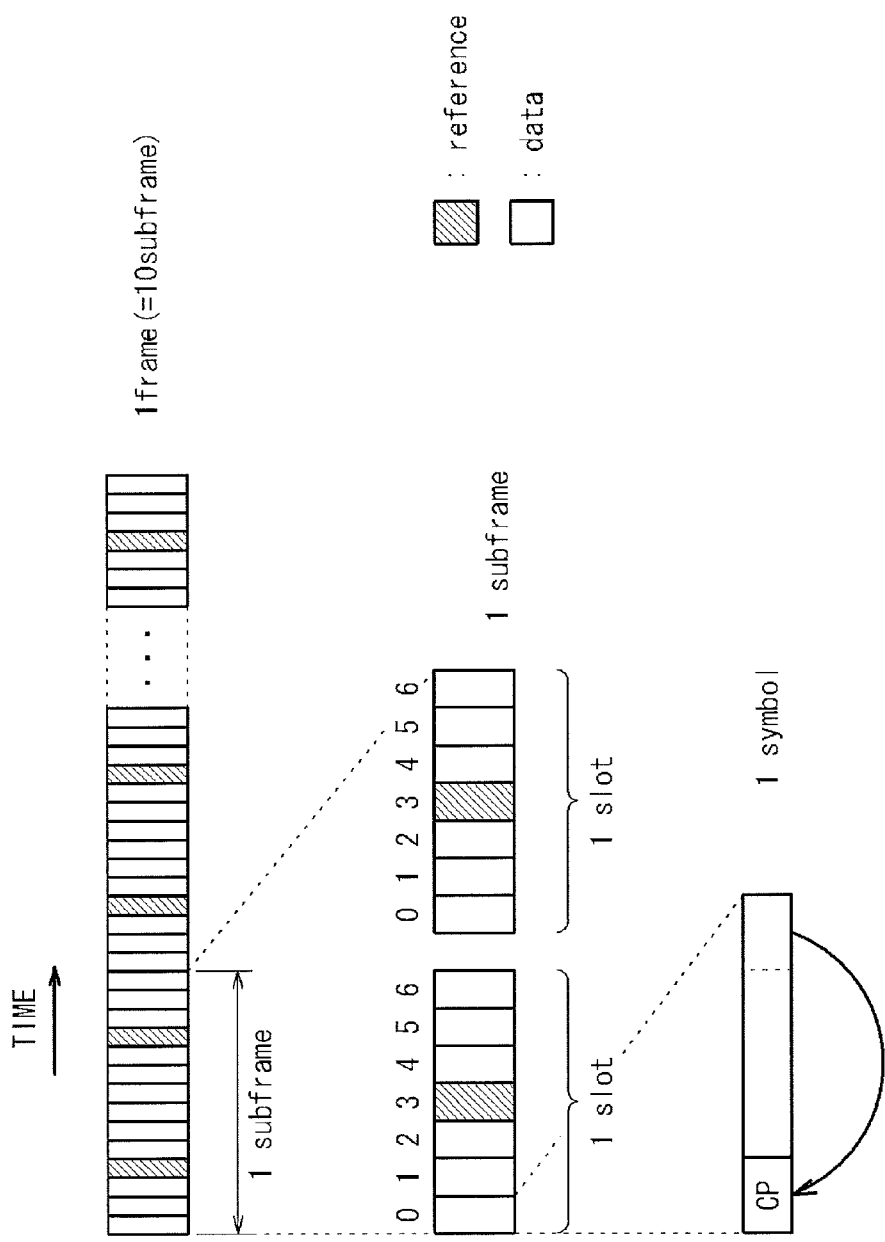
FIG. 2 is a diagram showing a structure of an LTE uplink radio frame.

FIG. 2 is a diagram showing a structure of an LTE uplink radio frame. This frame is shared by a plurality of mobile terminals by frequency division multiplexing, enabling multiple access by a base station apparatus. In addition to frequency division multiplexing, spatial division multiplexing may be performed. Each mobile terminal achieves frame synchronization when establishing a communication connection with the base station apparatus.

As shown in FIG. 2, one LTE uplink radio frame includes 10 subframes arranged in a time-axis direction and has a time length of 10 milliseconds.

One subframe includes two slots arranged in the time-axis direction and has a time length of 1 millisecond. One slot includes seven (or six) symbols arranged in the time-axis direction and has a time length of 0.5 milliseconds.

To the front of each of the symbols forming a slot, a copy of the last portion of the symbol is added as a CP (Cyclic Prefix). Note that each symbol includes N subsymbols (N is an integer greater than or equal to 2) which are modulated data symbols (QPSK modulated data symbols, QAM modulated data symbols, etc.).

Figure 3:
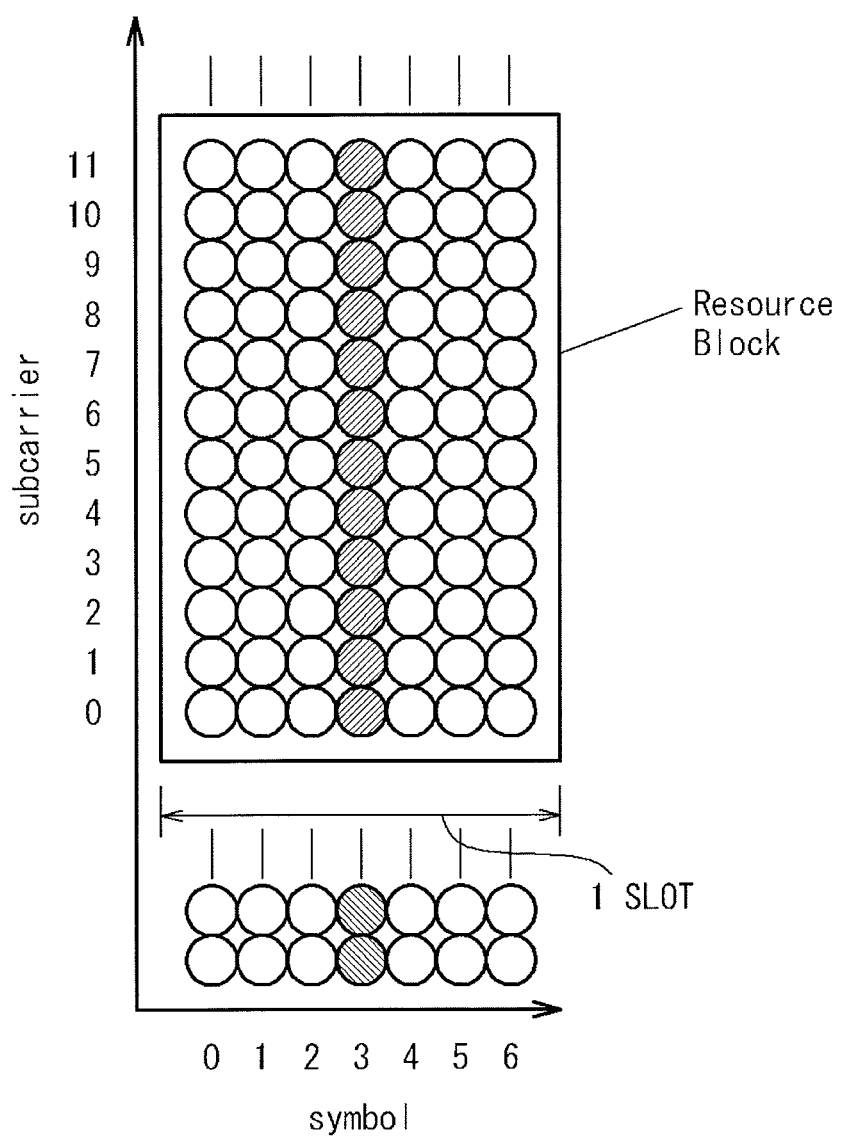
FIG. 3 is a diagram more specifically showing a structure of a slot.

FIG. 3 is a diagram more specifically showing a structure of a slot. Referring to FIGS. 2 and 3, in a slot, of the symbols forming the slot, the fourth symbol (symbol number 3) is a reference signal (hatched circle) which is a known signal, and other symbols are data signals (open circles). In the fourth symbol (symbol number 3) in the slot, all subcarriers are reference signals.

In addition, in LTE, a minimum unit of radio resource allocation, called a resource block, is set and one resource block has 7 or 6 symbols×12 subcarriers.

In LTE uplink employing the SC-FDMA scheme, in order to maintain a low PAPR which is a feature of SC-FDMA, transmitted data from a single user is allocated to a plurality of resource blocks arranged consecutively in a frequency direction.

Note that user allocation (frequency allocation) is determined by the base station apparatuses BS1 and BS2. Each of the base station apparatuses BS1 and BS2 notifies mobile terminals connected or attempting to connect to the base station apparatus of determined user allocation information, using a downlink frame. The mobile terminals having received the notification perform uplink communication using frequencies (subcarriers) allocated thereto by the base station apparatuses.

1.2 Configuration of a Base Station Apparatus

Figure 4:
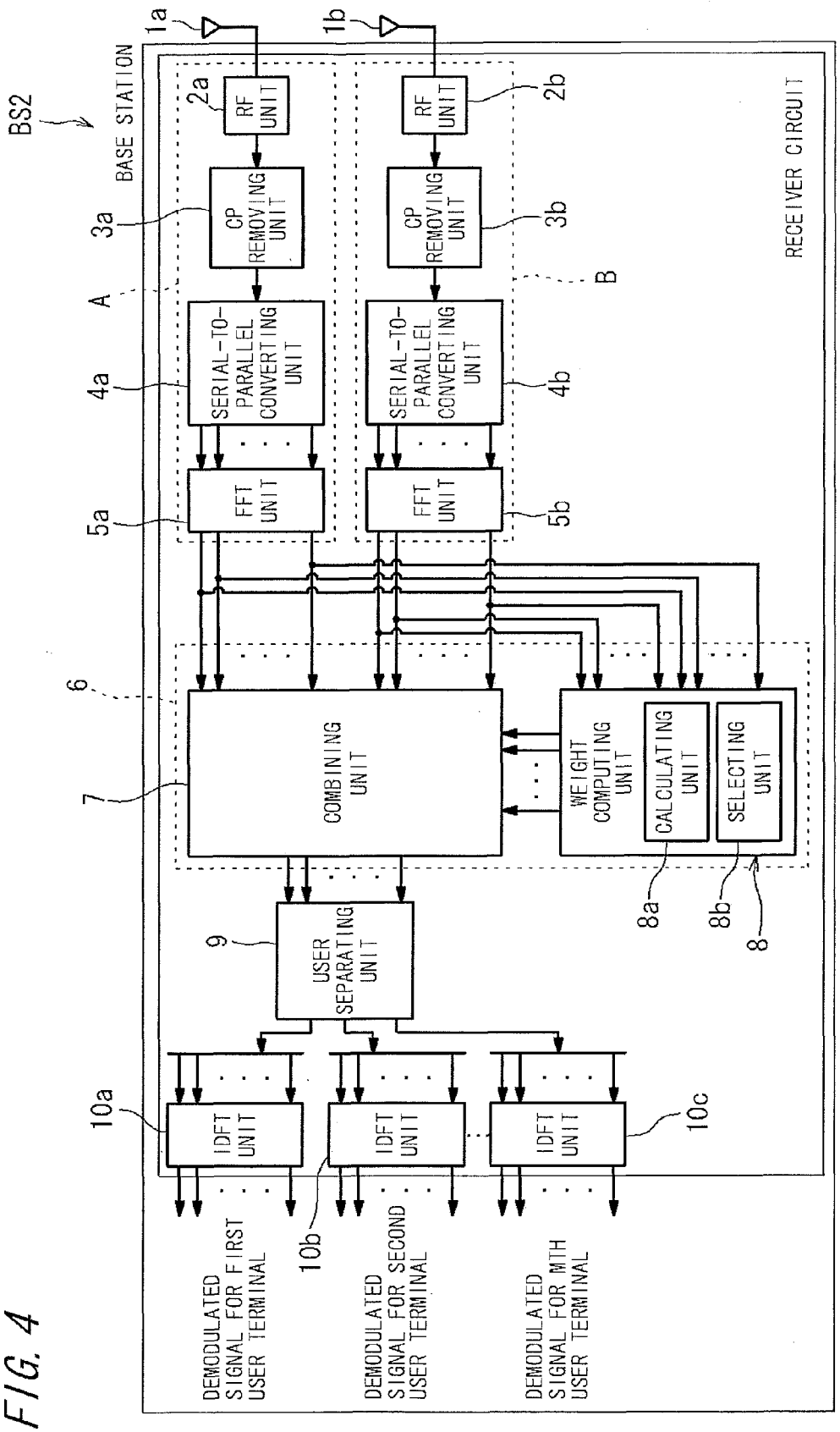
FIG. 4 is a block diagram showing a configuration of a receiver circuit of a base station apparatus according to an embodiment of the present invention.

FIG. 4 is a block diagram showing a configuration of a receiver circuit of the base station apparatus BS2 according to an embodiment of the present invention. Note that although the receiver circuit of the base station apparatus BS2 including a femto base station apparatus is described herein, a receiver circuit of the base station apparatus BS1 which is a macro base station apparatus is basically the same as the receiver circuit of the base station apparatus BS2 which will be described below.

The base station apparatus BS2 has a plurality of antennas (two antennas in the example in the drawing) $1a$ and $1b$ forming an adaptive array; and reception processing sequences A and B, the number of which corresponds to the number of the antennas $1a$ and $1b$. Received signals received by the antennas $1a$ and $1b$ are transformed into frequency domain signals by the corresponding processing sequences A and B provided for the antennas, respectively.

The reception processing sequences A and B respectively include RF units $2a$ and $2b$, CP removing units $3a$ and $3b$, serial-to-parallel converting units $4a$ and $4b$, and FFT units $5a$ and $5b$.

The RF units $2a$ and $2b$ perform an amplification process, an A/D conversion process, etc., on the received signals (SC-FDMA signals) received by the antennas $1a$ and $1b$, respectively.

The CP removing units $3a$ and $3b$ perform a process of removing CPs added to symbols forming the received signals.

The serial-to-parallel converting units $4a$ and $4b$ respectively convert the received signals from which CPs have been removed by the CP removing units $3a$ and $3b$, into parallel signals and output the parallel signals to their corresponding FFT units $5a$ and $5b$.

The FFT units 5a and 5b perform FFT (Fast Fourier Transform) on the received signals obtained after the conversion and provided from the serial-to-parallel converting units 4a and 4b, and thereby transform the received signals into frequency domain signals.

The FFT units 5a and 5b outputs the received signals having been transformed into frequency domain, to a multi-antenna signal processing unit 6.

The multi-antenna signal processing unit 6 performs multi-antenna signal processing based on the plurality of received signals provided from the respective FFT units 5a and 5b, and outputs signals that are obtained by removing, from the received signals, interference signals, etc., other than user signals from user terminals connected to the base station apparatus.

The multi-antenna signal processing unit 6 is configured to perform multi-antenna signal processing by an adaptive array scheme, and removes interference waves coming from mobile terminals in another cell which are interfering stations, enabling improvement in reception quality. Note that for the adaptive array scheme there are a ZF (Zero Forcing) scheme and an MMSE (Minimum Mean Square Error) scheme, and in these schemes weights are calculated using reference signals which are known signals.

The multi-antenna signal processing unit 6 includes a combining unit 7 and a weight calculating unit 8.

The combining unit 7 combines the plurality of received signals received by the plurality of antennas 1a and 1b, based on weights calculated by the weight calculating unit 8 and outputs a single processed signal where interference waves are removed, as a processing result.

The weight calculating unit 8 obtains only a plurality of received reference signals included in each of the plurality of received signals from the FFT units 5a and 5b, and calculates weights for each of the plurality of received reference signals.

In addition, weights of a plurality of received data signals included in each of the plurality of received signals are estimated using the calculated weights of the received reference signals. The weight calculating unit 8 extrapolates a received data signal of which weight is to be determined, using weights of a plurality of received reference signals located to sandwich the received data signal in the frequency direction or in the time-axis direction, and thereby determines a weight of the received data signal.

The weight calculating unit 8 includes a calculating unit 8a and a selecting unit 8b, as functional units for calculating weights of received reference signals. A method of calculating a weight of a received reference signal by the calculating unit 8a and the selecting unit 8b will be described later.

The multi-antenna signal processing unit 6 outputs the processed signal obtained by performing multi-antenna signal processing on the plurality of received signals, to a user separating unit 9. The user separating unit 9 demultiplexes the processed signal (frequency domain signal) outputted from the multi-antenna signal processing unit 6 into signals for the respective user terminals, based on allocation information indicating frequency allocation to the user terminals.

The signals (frequency domain signals) for the respective user terminals demultiplexed by the user separating unit 9 are outputted to IDFT units 10a, 10b, and 10c which are provided for the respective users.

The IDFT units 10a, 10b, and 10c perform an inverse discrete Fourier transform on the processed signal outputted from the multi-antenna signal processing unit 6, to transform the signals transmitted from the user terminals into time domain signals and thereby obtain demodulated signals for the respective mobile terminals.

1.3 For a Method of Calculating Weights of Received Reference Signals

The weight calculating unit 8 has, as described above, the function of calculating weights of received reference signals by the calculating unit 8a and the selecting unit 8b.

The calculating unit 8a calculates, by a calculation method where a sequential update is performed, estimation errors between a plurality of received reference signals included in received signals from the respective reception sequences A and B and known transmitted reference signals at transmission, and weights of the received reference signals for the estimation errors.

Note that in the present embodiment a calculation method based on an LMS (Least Mean Square) algorithm is employed as a sequential update type weight calculation method.

Figure 5:
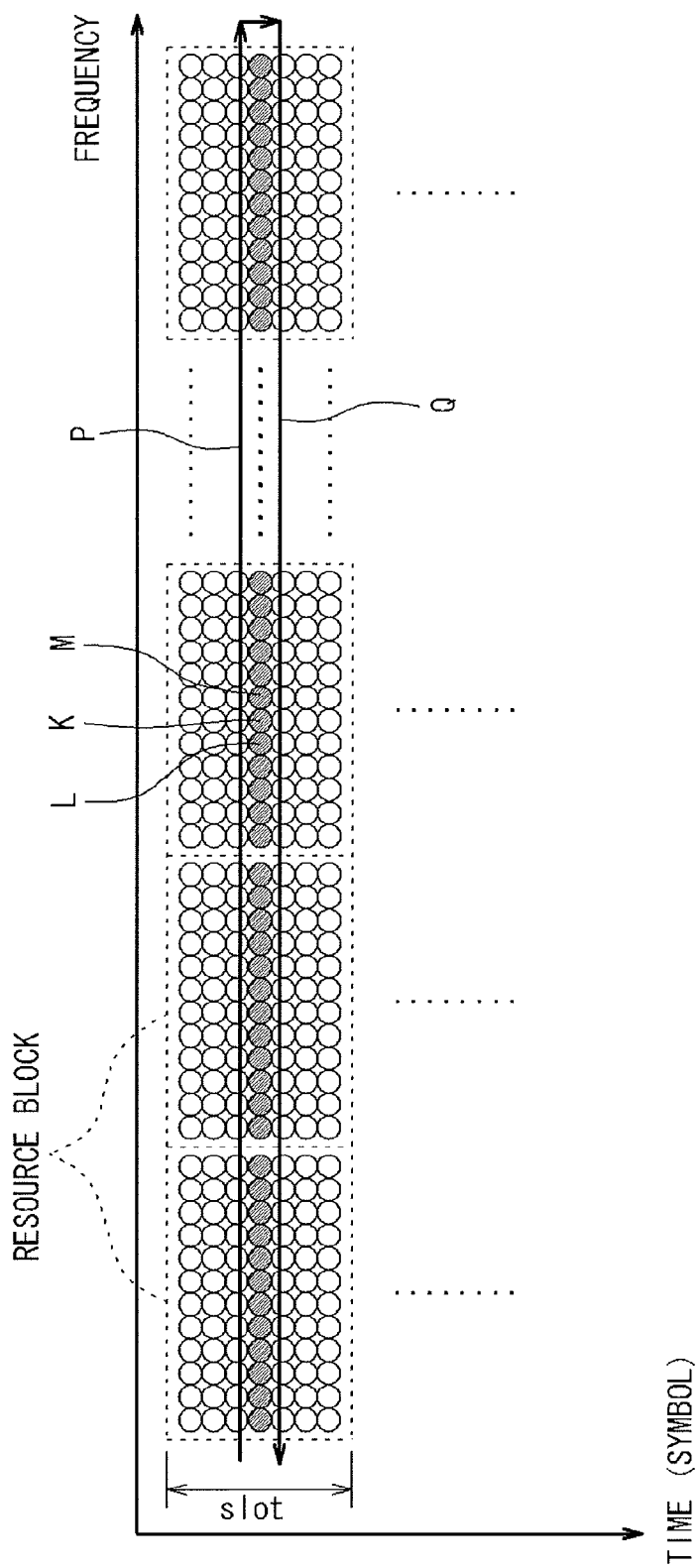
FIG. 5 is a diagram for describing an update direction for received reference signals when a calculating unit calculates weights of the received reference signals.

FIG. 5 is a diagram for describing an update direction for received reference signals when the calculating unit 8a calculates weights of the received reference signals.

In FIG. 5, a part of a received signal is represented by received data signals and received reference signals that form the received signal, and the horizontal axis represents frequency and the vertical axis represents symbol. Note that received data signals are represented by open circles and received reference signals are represented by hatched circles.

When the calculating unit 8a obtains a plurality of received reference signals included in each of a plurality of received signals from the respective reception sequences A and B, the calculating unit 8a selects a resource block which is a predetermined region in a predetermined order and calculates weights using received reference signals included in the selected resource block.

In the present embodiment, the uplink employs the SC-FDMA scheme and, as described above, a single user is allocated to a plurality of resource blocks arranged consecutively in the frequency direction.

Therefore, the calculating unit 8a is configured to select a resource block in the order in which the resource blocks are arranged consecutively in the frequency direction, and calculate weights of respective received reference signals.

In addition, the calculating unit 8a calculates a first weight and a second weight of the same target received reference signal which is an update target. The first weight is a weight obtained by updating, using the target received reference signal, a weight of first another received reference signal which is updated immediately before performing an update using the target received reference signal. The second weight is a weight obtained by updating, using the target received reference signal, a weight of a second another received reference signal different than the first another received reference signal.

In the present embodiment, as shown in FIG. 5, the calculating unit 8a obtains received reference signals arranged for respective subcarriers on the same symbol and selects a resource block in the order in which the resource blocks are arranged in the frequency direction, and every time a resource block is selected, the calculating unit 8a sequentially performs an update computation using received reference signals included in the selected resource block, and thereby calculates an estimation error and first and second weights of the estimation error, for each of the received reference signals.

In FIG. 5, the calculating unit 8a selects a resource block in order (first order) along a direction of arrow P in the drawing along the frequency direction and calculates, for each of received reference signals in the selected resource block, a first weight obtained by sequentially performing an update computation over the entire bandwidth in order of subcarrier number, and selects a resource block in order (second order different than the first order) along a direction of arrow Q in the drawing which is the opposite direction to the arrow P, and calculates, for each received reference signal, a second weight obtained by sequentially performing an update computation over the entire bandwidth in descending order of subcarrier number.

As shown in FIG. 5, the calculating unit 8a determines first and second weights such that in the first order a received reference signal adjacent, on the smaller subcarrier number side, to a target received reference signal K is used as a first another received reference signal L, and in the second order a received reference signal adjacent, on the larger subcarrier number side, to the target received reference signal K is used as a second another received reference signal M.

Therefore, upon determining first and second weights of received reference signals included in a selected resource block, the calculating unit 8a sequentially performs an update computation using the fact that the first another received reference signal L, the second another received reference signal M, and the target received reference signal K are arranged along the frequency direction.

The selecting unit 8b selects, for each received reference signal, one of the two weights determined by the calculating unit 8a that has a lower estimation error, as a weight of the received reference signal and uses the weight for estimation of a weight of a received data signal.

Figure 6:
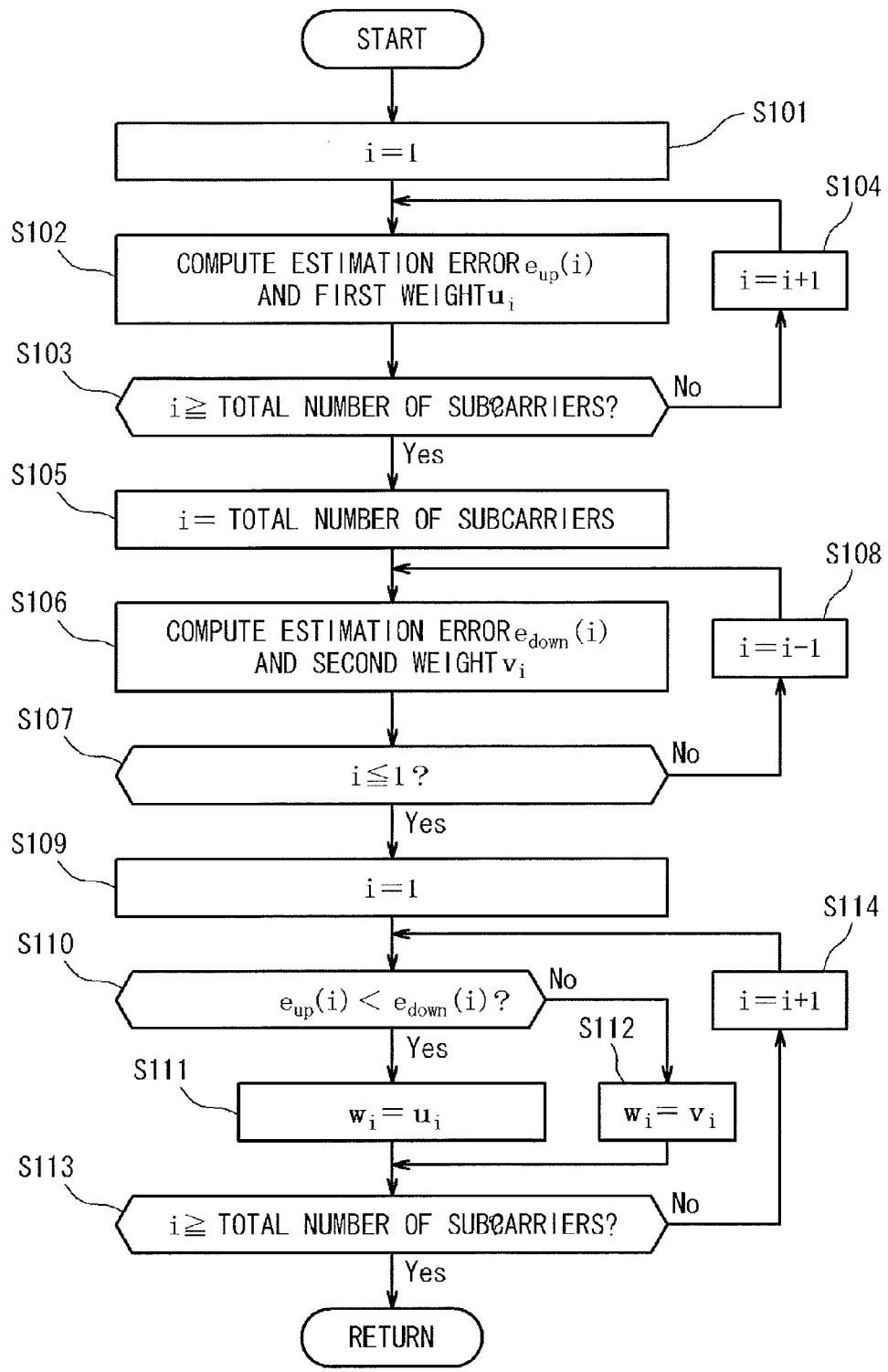
FIG. 6 is a flowchart showing a procedure used when the calculating unit and a selecting unit calculate weights of received reference signals.

FIG. 6 is a flowchart showing a procedure used when the calculating unit 8a and the selecting unit 8b calculate weights of received reference signals.

When the calculating unit 8a obtains a received reference signal arranged for each subcarrier on the same symbol, first, the calculating unit 8a sets a count value i of a counter provided internally in the weight calculating unit 8 to "1" (step S101). Note that the count value i corresponds to the subcarrier number in a computation in the following.

Then, the calculating unit 8a computes an estimation error $e_{up}(i)$ and a first weight $u_i$ (step S102) and determines whether the count value i is greater than or equal to (the subcarrier number corresponding to) the total number of subcarriers of a received signal (step S103). If the count value i is not greater than or equal to the total number of subcarriers, then the calculating unit 8a proceeds to step S104 and increments the count value i and performs a computation again (step S102) and repeats the processes in steps S102 to S104 until the count value i reaches greater than or equal to the total number of subcarriers. By this, the calculating unit 8a determines an estimation error $e_{up}(i)$ and a first weight $u_i$ for the estimation error $e_{up}(i)$ for a received reference signal for each subcarrier, for the total number of subcarriers in order of subcarrier number, i.e., over the entire bandwidth of the received signal.

In step S102, the calculating unit 8a computes an estimation error $e_{up}(i)$ and a first weight $u_i$ for the estimation error $e_{up}(i)$, based on the following equations (1) and (2).

$$e_{up}(i)=s(i)-u_{i-1}^{H} \cdot x(i) \quad (1)$$

$$u_i=u_{i-1}+\mu \cdot x(i) \cdot e_{up}(i)^* \quad (2)$$

In the above-described equations, $x(i)$ is the power of a received reference signal and a vector having, as its element, the power of a received reference signal set for each antenna. The first weight $u_i$ is a vector having, as its element, a weight of a received reference signal for each antenna. $s(i)$ is the power of a transmitted reference signal at transmission and is known. $u_{i-1}^{H}$ is the complex conjugate transpose of a first weight whose count value (subcarrier number) i is preceded by 1, and $e_{up}(i)^*$ is the complex conjugate of an estimation error $e_{up}(i)$.

Note that for the complex conjugate transpose $u_{i-1}^{H}$ in the case of the count value i being "1", the calculating unit 8a stores in advance an initial value and performs a computation using the initial value.

As shown in the above-described equations (1) and (2), the calculating unit 8a repeats steps S102 to S104 and thereby determines the current first weight $u_i$, using a first weight $u_{i-1}$ which is determined in a computation where the count value i is preceded by 1 and the current estimation error $e_{up}(i)$. That is, the calculating unit 8a calculates a first weight $u_i$ while sequentially performing an update computation in order of subcarrier number, and thereby obtains first weights $u_i$ for the received reference signals for all subcarriers.

By the calculating unit 8a determining first weights $u_i$ by the above-described procedure, as a result, the calculating unit 8a selects a resource block in the first order along the direction of the arrow P in FIG. 5 and determines first weights $u_i$ for respective received reference signals included in the selected resource block.

If it is determined in step S103 that the count value i is greater than or equal to the total number of subcarriers, then the calculating unit 8a sets the count value i to the "total number of subcarriers" (step S105).

Then, the calculating unit 8a computes an estimation error $e_{down}(i)$ and a second weight $v_i$ (step S106) and determines whether the count value i is less than or equal to "1" (step S107). If the count value i is not less than or equal to "1", then the calculating unit 8a proceeds to step S108 and decrements the count value i and performs a computation again (step S106) and repeats the processes in steps S106 to S108 until the count value i reaches less than or equal to "1". By this, the calculating unit 8a determines an estimation error $e_{down}(i)$ and a second weight $v_i$ for the estimation error $e_{down}(i)$ for a received reference signal for each subcarrier, for the total number of subcarriers in descending order of subcarrier number, i.e., over the entire bandwidth of the received signal.

In step S106, the calculating unit 8a computes an estimation error $e_{down}(i)$ and a second weight $v_i$, based on the following equations (3) and (4).

$$e_{down}(i)=s(i)-v_{i+1}^{H} \cdot x(i) \quad (3)$$

$$v_i=v_{i+1}+\mu \cdot x(i) \cdot e_{down}(i)^* \quad (4)$$

In the above-described equations, $x(i)$ is the power of a received reference signal and a vector having, as its element, the power of a received reference signal set for each antenna. The second weight $v_i$ is a vector having, as its element, a weight of a received reference signal for each antenna. $v_{i+1}^{H}$ is the complex conjugate transpose of a second weight whose count value (subcarrier number) i is preceded by 1, and $e_{down}(i)^*$ is the complex conjugate of an estimation error $e_{down}(i)$.

Note that for the complex conjugate transpose $v_{i+1}^{H}$ in the case of the count value i being the "total number of subcarriers", the calculating unit 8a stores in advance an initial value and performs a computation using the initial value.

As shown in the above-described equations (3) and (4), the calculating unit 8a repeats steps S106 to S108 and thereby determines the current second weight $v_i$, using a second weight $v_{i+1}$ which is determined in a computation where the count value i is preceded by 1 and the current estimation error $e_{down}(i)$. That is, the calculating unit 8a calculates a second weight $v_i$ while sequentially performing an update computation in descending order of subcarrier number, and thereby obtains second weights $v_i$ of the received reference signals for all subcarriers.

In the above-described manner, the calculating unit $8a$ calculates, for each received reference signal, a first weight $u_i$ obtained by sequentially performing an update computation over the entire bandwidth in order of subcarrier number along the direction of the arrow P in FIG. 5 (forward direction), and a second weight $v_i$ obtained by sequentially performing an update computation over the entire bandwidth in descending order of subcarrier number along the direction of the arrow Q in FIG. 5 which is the opposite direction to the arrow P.

By the calculating unit $8a$ determining second weights $v_i$ by the above-described procedure, as a result, the calculating unit $8a$ selects a resource block in the second order along the direction of the arrow Q in FIG. 5 and determines second weights $v_i$ of respective received reference signals included in the selected resource block.

If it is determined in step S107 that the count value i is less than or equal to "1", then the calculating unit $8a$ sets the count value i to "1" (step S109).

Then, the estimation error $e_{up}(i)$ for the first weight $u_i$ is compared with the estimation error $e_{down}(i)$ for the second weight $v_i$ to determine whether the estimation error $e_{up}(i)$ is smaller than the estimation error $e_{down}(i)$ (step S110).

If the estimation error $e_{up}(i)$ is smaller than the estimation error $e_{down}(i)$, then the selecting unit $8b$ adopts the first weight $u_i$ for the estimation error $e_{up}(i)$ as a weight $w_i$ for the received reference signal (subcarrier number i) which is a calculation result (step S111) and proceeds to step S113.

On the other hand, if the estimation error $e_{up}(i)$ is not smaller than the estimation error $e_{down}(i)$, then the selecting unit $8b$ adopts the second weight $v_i$ for the estimation error $e_{down}(i)$ as a weight $w_i$ for the received reference signal (step S112) and proceeds to step S113. That is, the selecting unit $8b$ adopts one of the first and second weights $u_i$ and $v_i$ for the same received reference signal that has a smaller estimation error, as a weight $w_i$ for the received reference signal.

Then, the selecting unit $8b$ determines in step S113 whether the count value i is greater than or equal to the "total number of subcarriers" (step S113). If the count value i is not greater than or equal to the total number of subcarriers, then the selecting unit $8b$ proceeds to step S114 and increments the count value i and proceeds to step S110 and performs again (step S110) and repeats the processes in steps S110 to S114 until the count value i reaches greater than or equal to the total number of subcarriers. If it is determined in step S113 that the count value i is greater than or equal to the total number of subcarriers, then the selecting unit $8b$ ends the process.

By this, the selecting unit $8b$ can determine weights $w_i$ of the received reference signals for the respective subcarriers over the entire bandwidth (the total number of subcarriers) of the received signal.

As described above, the calculating unit $8a$ and the selecting unit $8b$ calculate, for a plurality of received reference signals included in received signals from the respective reception sequences A and B, weights $w_i$ of the received reference signals by a calculation method where a sequential update is performed.

1.4 For a Specific Mode of Weight Calculation

Next, a specific mode of weight calculation for received reference signals by the calculating unit $8a$ and the selecting unit $8b$ will be described.

Here, the case is considered in which in a state in which in FIG. 1 the mobile terminals MS1 to MS4 are connected to the base station apparatus BS1 being a macro base station apparatus and the mobile terminals MS5 and MS6 are connected to the base station apparatus B2 being a femto base station apparatus, the base station apparatus BS2 calculates weights of received signals from the mobile terminals MS5 and MS6.

In this case, since the mobile terminals MS1 to MS4 are connected to the base station apparatus BS1, resources allocated to the mobile terminals MS5 and MS6 by the base station apparatus BS2 may overlap with those allocated to the mobile terminals MS1 to MS4 and thus the mobile terminals MS1 to MS4 are interfering sources to the base station apparatus BS2.

Figure 7:
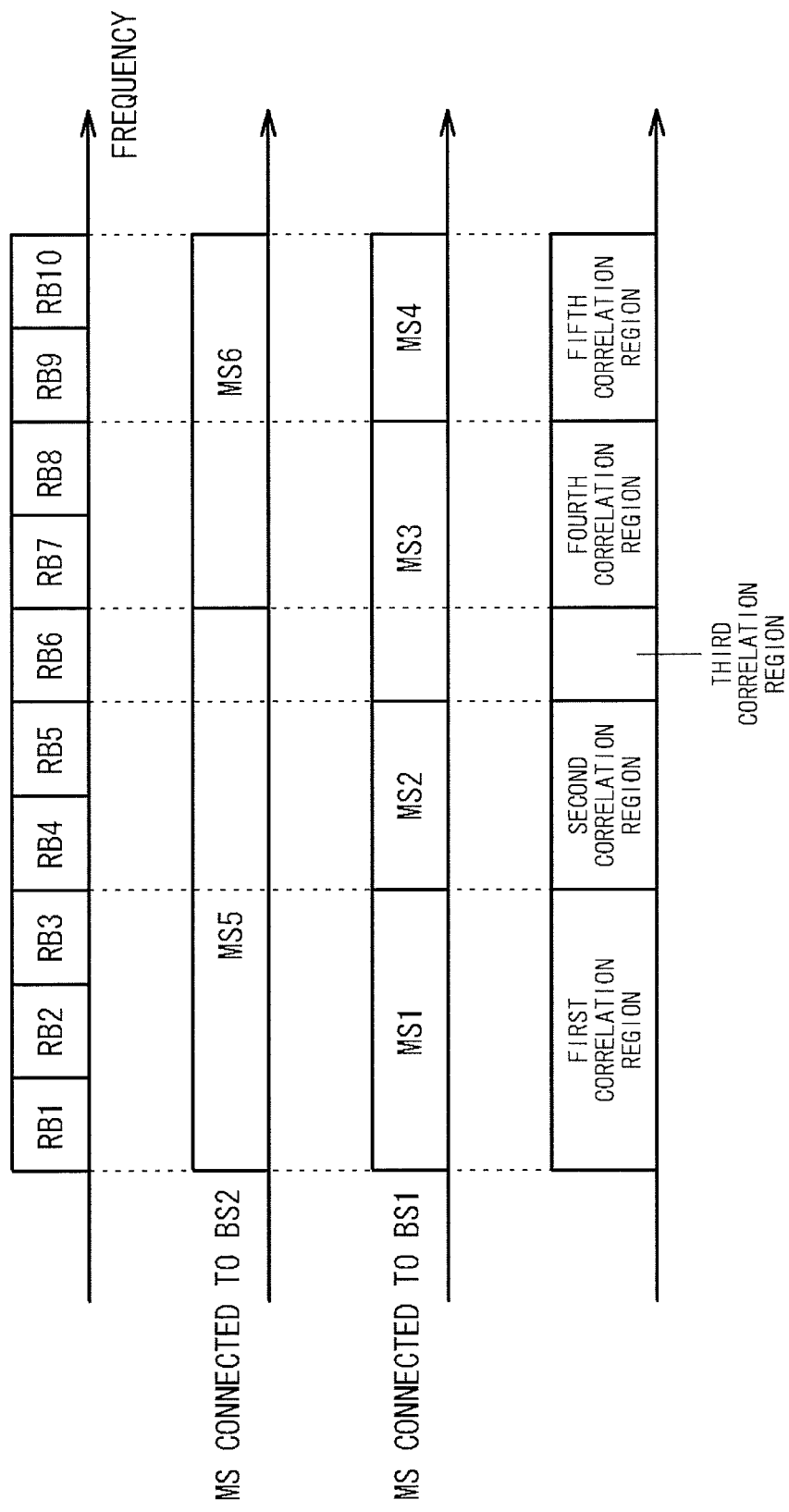
FIG. 7 is a schematic diagram showing an example of the state of radio resource allocation to mobile terminals in the uplink.

FIG. 7 is a schematic diagram showing an example of the state of radio resource allocation to the mobile terminals MS1 to MS6 in the uplink for the above-described case. Note that in FIG. 7 the bandwidth in the frequency direction is indicated by the range of 10 resource blocks (RB1 to RB10) and the state of radio resource allocation to the mobile terminals MS1 to MS6 in this range is schematically shown. Note also that the resource blocks RB1 to RB10 are arranged in order of subcarrier number.

In FIG. 7, the mobile terminal MS5 connected to the base station apparatus BS2 is allocated resource blocks arranged consecutively in the frequency direction in the range of RB1 to RB6. The mobile terminal MS6 connected to the base station apparatus BS2 is allocated resource blocks arranged consecutively in the frequency direction in the range of RB7 to RB10.

On the other hand, the mobile terminal MS1 connected to the base station apparatus BS1 is allocated resource blocks arranged consecutively in the frequency direction in the range of RB1 to RB3, the mobile terminal MS2 is allocated resource blocks in the range of RB4 and RB5, the mobile terminal MS3 is allocated resource blocks in the range of RB6 to RB8, and the mobile terminal MS4 is allocated resource blocks in the range of RB9 and RB10.

In this case of FIG. 7, all of the resource blocks allocated to the mobile terminals MS5 and MS6 connected to the base station apparatus BS2 overlap with the resource blocks allocated to the mobile terminals MS1 to MS4 connected to the base station apparatus BS1.

Here, it is considered that in the base station apparatus BS2 the directivity of a received signal varies between resource block regions having different combinations of mobile terminals whose allocated resource blocks overlap with each other. That is, as shown in FIG. 7, the band represented by the resource blocks RB1 to RB10 can be divided, as resource block regions having different directivities for different frequencies, into five regions, a first correlation region where the mobile terminal MS5 and the mobile terminal MS1 overlap with each other, a second correlation region where the motile terminal MS5 and the mobile terminal MS2 overlap with each other, a third correlation region where the mobile terminal MS5 and the mobile terminal MS3 overlap with each other, a fourth correlation region where the mobile terminal MS6 and the mobile terminal MS3 overlap with each other, and a fifth correlation region where the mobile terminal MS6 and the mobile terminal MS4 overlap with each other.

It is considered that between resource blocks belonging to each correlation region, received data signals and received reference signals belonging to the resource blocks have a high correlation therebetween in the frequency direction, including an influence by an interference wave, and thus, weights w of the respective received reference signals have substantially the same value.

Even in the state such as that shown in FIG. 7, regardless of allocation to the mobile terminals MS5 and MS6, etc., the calculating unit 8a and the selecting unit 8b of the present embodiment select a resource block in order along the frequency direction and calculate weights of received reference signals included in the selected resource block.

FIG. 8 is a diagram showing an example of the case in which the calculating unit 8a and the selecting unit 8b calculate weights of received reference signals in the state shown in FIG. 7.

FIG. 8 shows the case in which the calculating unit 8a obtains received reference signals included in each of the resource blocks RB1 to RB10, selects a resource block in order from the resource block RB1 to RB10 along arrow P in the drawing, and sequentially performs an update computation on a plurality of received reference signals included in each of the resource blocks and thereby calculates first weights $u_i$, and selects a resource block in order from the resource block RB10 to RB1 along arrow Q in the drawing, and sequentially performs an update computation on a plurality of received reference signals included in each of the resource blocks and thereby calculates second weights $v_i$.

(a) of FIG. 8 is a graph showing calculation results of estimation errors $e_{up}(i)$ for the first weights $u_i$ and (b) of FIG. 8 is a graph showing calculation results of estimation errors $e_{down}(i)$ for the second weights $v_i$. In the drawing, the vertical axis represents the value obtained by multiplying estimation error e by "−1" and the horizontal axis represents frequency corresponding to the resource blocks RB1 to RB10.

As shown in the drawing, a chart R representing the estimation errors $e_{up}(i)$ for the first weights $u_i$ shows that for each correlation region the estimation error decreases to converge to "0" toward the direction of the arrow P, and in a boundary portion between a correlation region and its adjacent correlation region the estimation error temporarily increases and thereafter decreases to converge to "0" again, which is repeated every correlation region.

This is because, as described above, in each correlation region, between resource blocks belonging to each correlation region, received data signals and received reference signals belonging to the resource blocks have a high correlation in the frequency direction, and thus, weights w of the respective received reference signals have substantially the same value. Therefore, by sequentially updating received reference signals belonging to the same correlation region and thereby calculating weights, the weights converge to an optimal weight in the correlation region and the estimation accuracy thereof gradually increases.

On the other hand, when exceeding a boundary between a correlation region and its adjacent correlation region, the directivity changes and an optimal weight in the adjacent correlation region is different, and thus, the estimation error temporarily increases in the boundary portion.

A chart S representing the estimation errors $e_{down}(i)$ for the second weights $v_i$ in (b) of FIG. 8 also shows that, for the same reasons as those described above, for each region the estimation error decreases to converge to "0" toward the direction of the arrow Q, and in a boundary portion between a correlation region and its adjacent correlation region the estimation error temporarily increases and thereafter decreases to converge to "0" again, which is repeated every correlation region.

(c) of FIG. 8 is a graph showing an estimation error e when the smaller one of the estimation errors for two weights is selected. Since the selecting unit 8b selects a weight for the smaller one of the estimation errors for two weights, estimation errors $e_i$ for weights $w_i$ of the received reference signals which are calculation results have values such as those shown in a chart T in the drawing.

As such, in the present embodiment, since the selecting unit 8b selects a weight for the smaller one of the estimation errors for two weights, a portion of the first weight $u_i$ and the second weight $v_i$ that has high estimation accuracy can be obtained as a weight $w_i$ of a received reference signal.

According to the base station apparatus BS2 having the above-described configuration, the calculating unit 8a in the weight calculating unit 8 calculates weights of a respective plurality of received reference signals included in each of received signals from the respective reception sequences, by a calculation method where a sequential update is performed. Thus, there is no need to perform estimation of a correlation matrix for determining a weight on a per minimum unit (resource block) basis and a computation thereof, as done in the above-described conventional example, and thus, the amount of computation can be reduced, enabling reduction in the computation load.

In addition, in the present embodiment, receiving a signal to be transmitted by an SC-FDMA scheme which is a scheme for allocating a plurality of consecutively arranged resource blocks to a single user causes a possibility that a plurality of resource blocks correlated with each other, including an influence by an interference wave, may be present consecutively. Hence, by selecting a resource block in the first and second orders which are selection orders along the frequency direction, in a correlation region where the plurality of correlated resource blocks are present consecutively, more received reference signals for use in sequential update can be obtained and thus values with a low estimation error and high accuracy can be obtained.

By the above, according to the present embodiment, while reducing the computation load, weights with high accuracy of received reference signals can be obtained and thus interference waves can be effectively removed from a received signal.

In addition, in the present embodiment, the calculating unit 8a in the weight calculating unit 8 calculates first weights $u_i$ by performing a sequential update using received reference signals over the entire bandwidth in order of subcarrier number by proceeding through resource blocks in the first order along the frequency direction, and thereafter determines second weights $v_i$ by sequentially updating received reference signals over the entire bandwidth by proceeding through the resource blocks in the second order. However, in the case in which the state of allocation to mobile terminals is the one shown in FIG. 7, for example, as shown in (a) of FIG. 9, first, first weights $u_i$ may be calculated with the order proceeding from RB10 to RB1 being the first order, and thereafter, second weights $v_i$ may be calculated with the order proceeding from RB1 to RB10 being the second order.

Furthermore, as shown in (b) of FIG. 9, with the order proceeding from RB1 to RB10 being the first order and the order proceeding from RB10 to RB1 being the second order, processing may proceed back and forth randomly over the entire bandwidth and two types of weights $u_i$ and $v_i$ may be finally calculated for the entire band. When a first or second weight is calculated three times or more for the same region, a weight with the smallest estimation error is finally adopted as a weight $w_i$ for a received reference signal. Note that in this case in all regions there is a need to obtain first and second weights $u_i$ and $v_i$ by performing at least a sequential update computation in a forward direction and a backward direction.

In addition, in LTE, when a frequency hopping scheme is not employed upon radio resource allocation, it can be identified that a pair of resource blocks arranged in the same frequency band in two slots forming a subframe are allocated to the same user, without referring to user allocation information, etc. Thus, the calculating unit 8a can also determine first and second weights $u_i$ and $v_i$ by sequentially selecting the pair of resource blocks as a predetermined region in a predetermined order along the frequency direction, and performing, as shown in (a) and (b) of FIG. 10, a sequential update using received reference signals included in the predetermined region.

Note that the present invention is not limited to the above-described embodiments.

Although in the above-described embodiment the case is exemplified in which a calculation method based on an LMS algorithm is employed as a sequential update type weight calculation method, for example, instead of this, a calculation method using an NLMS (Normalized LMS) algorithm, a calculation method using an RLS (Recursive Least Square) algorithm, or a calculation method using the Kalman filter can also be used.

In addition, although in the above-described embodiment the case is exemplified of employing an SC-FDMA scheme which is a scheme for allocating a plurality of resource blocks arranged consecutively in the frequency direction to a single user, for example, even in the case of a scheme for allocating a plurality of resource blocks arranged consecutively in the time direction to a single user, the present invention can be applied. That is, in this case, the configuration is such that a resource block is selected in a first order along the time direction and a first weight is determined and a resource block is selected in a second order different than the first order and a second weight is determined, and a weight of a received reference signal is determined using the first and second weights.

In addition, it is also possible that first and second weights are determined in each of two directions, the frequency direction and the time direction, and of the first and second weights a weight with the smallest estimation error is determined as a weight of a received reference signal.

Chapter 2 Channel Estimation

2.1 First Embodiment

2.1.1 Configuration of a Communication System

In chapter 2, description is made using LTE as an example of a communication scheme but the communication scheme is not limited thereto.

FIG. 11 is a schematic diagram showing a configuration of a radio communication system of an LTE scheme. The radio communication system includes a base station apparatus 201 and user terminals 202a and 202b.

The base station apparatus 201 includes a plurality of antennas, and the base station apparatus 201 and the user terminals 202a and 202b have the function of performing multi-user MIMO transmission.

In this communication system, the downlink employs Orthogonal Frequency Division Multiple Access (OFDMA) and the uplink employs Single Carrier Frequency Division Multiple Access (SC-FDMA).

An LTE uplink frame is shared by a plurality of user terminals by frequency division multiplexing, enabling multiple access to a base station apparatus. In addition to frequency division multiplexing, spatial division multiplexing is also performed.

In LTE, a minimum unit of resource allocation, called a resource block (RB), is set in a frame and, as shown in FIG. 11, one resource block has 7 or 6 symbols×12 subcarriers. In an LTE uplink data channel, in the fourth symbol in one slot, all subcarriers are reference signals which are known signals, and are represented by solid circles in FIG. 11. In the following, the reference signals are also referred to as "pilot signals".

Other symbols in one resource block are data signals and are represented by open circles in FIG. 11.

When taking a look at a given resource block with which spatial division multiplexing is performed, the plurality of user terminals 202a and 202b perform simultaneous transmission using signals $x_1$ and $x_2$ in the resource block.

Hence, the base station apparatus 201 receives signals (received signals $y_1$ and $y_2$) where transmitted signals $x_1$ and $x_2$ are multiplexed, by a plurality of antennas 203 (203a and 203b), respectively. That is, the received signal $y_1$ received by the antenna 203a is such that a received signal $y_{1\times1}$ corresponding to the transmitted signal $x_1$ and a received signal $y_{1\times2}$ corresponding to the transmitted signal $x_2$ are multiplexed, and the received signal $y_2$ received by the antenna 203b is such that a received signal $y_{2\times1}$ corresponding to the transmitted signal $x_1$ and a received signal $y_{2\times2}$ corresponding to the transmitted signal $x_2$ are multiplexed.

The base station apparatus 201 obtains, from the received signals $y_1$ and $y_2$ received by the respective plurality of antennas 203a and 203b, a received pilot signal included in each of the received signals $y_1$ and $y_2$. The received pilot signal is such that pilot signals for the transmitted signals $x_1$ and $x_2$ are multiplexed, respectively.

The user terminals 202a and 202b perform a cyclic shift process on pilot signals included in transmitted signals $x_1$ and $x_2$ and then transmit the transmitted signals $x_1$ and $x_2$. The cyclic shift process is a process of cyclically shifting pilot signals in a frequency-axis direction by different amounts of shift for different user terminals, by which a received pilot signal received by the base station apparatus 201 in a multiplexed manner can be demultiplexed.

Based on the multiplexed received pilot signal obtained from the received signals $y_1$ and $y_2$, the base station apparatus 201 separates and obtains frequency responses of the respective received pilot signals for the respective transmitted signals $x_1$ and $x_2$, and performs channel estimation of the received signals corresponding to the respective transmitted signals $x_1$ and $x_2$. The base station apparatus 201 is configured to demultiplex another multiplexed data signal into data signals for the respective users using the estimated channels, and thereby obtain received data signals $\hat{x}_1$ and $\hat{x}_2$ for the respective user terminals 202a and 202b.

2.1.2 Configuration of the Base Station Apparatus

FIG. 12 is a block diagram showing a configuration of a principal part of a reception system of the base station apparatus 201.

The base station apparatus 201 serving as a communication apparatus of a first embodiment of the present invention includes a receiving unit 204 to which an antenna 203 is connected, and an FFT unit 205, a demultiplexing/equalizing unit 206, an IDFT unit 207, a demodulating unit 208, and a channel estimating unit 210. The base station apparatus 201 includes these units for each of the plurality of antennas 203 (203a and 203b) included in the base station apparatus 201.

The receiving unit 204 includes an amplifier, an A/D converter, etc., and amplifies a received signal y received by the plurality of antennas 203 and outputs a signal y(k) obtained by converting the received signal y into a digital signal (k=1, 2, ... L; L is the number of samples included during sampling time) to the FFT unit 205.

The FFT unit 205 performs a fast Fourier transform on the signal y(k) and thereby transforms the signal y(k) from time domain data to frequency domain data and optically demultiplexes subcarriers, etc., and outputs a data signal where subcarriers are removed to the demultiplexing/equalizing unit 206. In addition, the FFT unit 205 outputs, of the frequency domain transformed data signal, a received pilot signal r(k) to the channel estimating unit 210.

The channel estimating unit 210 estimates channel characteristics of received signals for the plurality of user terminals 202a and 202b based on the received pilot signal r(k), and outputs results of the estimation to the demultiplexing/equaling unit 206.

The demultiplexing/equaling unit 206 demultiplexes the frequency domain data signal provided from the FFT unit 205 into data signals for the respective user terminals based on the channel estimation results for the received signals of the respective plurality of user terminals 202a and 202b (e.g., in the case of a received signal $y_1$, received signals $y_{1\times1}$ and $y_{1\times2}$) which are estimated by the channel estimating unit 210, and performs an equalization process.

The data signals demultiplexed and equalized for the respective user terminals by the demultiplexing/equalizing unit 206 are provided to the IDFT unit 207 and are transformed into time domain data and thereafter the time domain data is demodulated by the demodulating unit 208.

2.1.3 Configuration of the Channel Estimating Unit

FIG. 13 is a block diagram showing a configuration of the channel estimating unit 210.

The channel estimating unit 210 includes, as shown in the drawing, a division unit 211, a DCT unit 212, a windowing process unit 213, and a plurality of IDCT units 214.

The division unit 211 divides a received pilot signal r(k) provided from the FFT unit 205 by a basic pilot signal s(k) which is a known signal and thereby normalizes the received pilot signal r(k) and obtains a channel frequency response h(k) of the received pilot signal r(k).

The received pilot signal r(k) is a multiplexed signal where pilot signals transmitted by the respective user terminals are multiplexed, and is represented as shown in the following equation (11).

$$r(k)=h_1(k)s(k)\times e^{j\alpha_1 k}+h_2(k)s(k)\times e^{j\alpha_2 k}+\ldots+h_N(k)s(k)\times e^{j\alpha_N k} \quad (11)$$

In equation (11), $h_n(k)$ (n=1 to N) is the channel frequency response for each user terminal, N is the number of user terminals, and $\alpha_n$ is the amount of shift in the frequency domain for each user terminal which is shown in the following equation (12):

$$\alpha_n=2\pi n_{cs}/N(n_{cs}=0,1,\ldots N-1) \quad (12)$$

The division unit 211 performs a division by a known basic pilot signal s(k) and thereby obtains a channel frequency response h(k) of the received pilot signal r(k) which is shown in the following equation (13).

$$h(k)=r(k)/s(k)=h_1(k)\times e^{j\alpha_1 k}+h_2(k)\times e^{j\alpha_2 k}+\ldots+h_N(k)\times e^{j\alpha_N k} \quad (13)$$

The DCT unit 212 serving as a first transforming unit performs a Discrete Cosine Transform (DCT) on the channel frequency response h(k) of the received pilot signal r(k) which is obtained by the division unit 211, and thereby transforms the channel frequency response h(k) into time domain and obtains a channel time response H(t) (k=1, 2, ... L; L is the number of samples included during sampling time) which is shown in the following equation (14).

$$H(t) = w(t)\sum_{K=1}^{L} h(k)\cos\frac{\pi(2k-1)(t-1)}{2L} \quad (14)$$

Note that when $t = 1$, $w(t) = \dfrac{1}{\sqrt{L}}$ when $t \neq 1$, $w(t) = \sqrt{\dfrac{2}{L}}$ As described above, the DCT unit 212 represents the frequency by a cosine function and thereby transforms frequency domain data into time domain.

The windowing process unit 213 performs a windowing process on the channel time response H(t) of the received pilot signal r(k) obtained by the DCT unit 212 to separate the channel time response H(t) into channel time responses of the received pilot signals for the respective user terminals.

The channel time response H(t) of the received pilot signal r(k) is represented as shown in the following equation (15).

$$\begin{aligned}H(t) &= \sum_{n=1}^{N} H_n\left(t - \frac{(n-1)T}{N}\right) \\ &= H_1(t) + H_2\left(t - \frac{T}{N}\right) + \\ &\quad H_3\left(t - \frac{2T}{N}\right) + \cdots + H_N\left(t - \frac{(N-1)T}{N}\right)\end{aligned} \quad (15)$$

Note that in the above-described equation (15), T is the symbol length.

The channel time responses $H_n(t)$ (n=1, ... N) of the received pilot signals for the respective user terminals which are the channel time responses of the respective plurality of reference signals are arranged at intervals of "T/N" in the time-axis direction, as shown in the above-described equation (15).

The windowing process unit 213 cuts out the channel time responses $H_n(t)$ of the received pilot signals (hereinafter, also simply referred to as the channel time responses $H_n(t)$) for the respective user terminals which are arranged in the time-axis direction in the manner described above, from the channel time response H(t) of the received pilot signal r(k), and thereby separates the channel time response H(t) into the channel time responses $H_n(t)$ for the respective user terminals.

The windowing process unit 213 also performs a process of removing the amount of offset in the time-axis direction ("nT/N" in the above-described equation (15)) from each of the separated channel time responses $H_n(t)$ for the respective user terminals, and thereby bringing channel time responses $H_n(t)$ back to the original position from the position (in the time-axis direction) to which the pilot signals are shifted by a cyclic shift process.

The windowing process unit 213 outputs the separated channel time responses $H_n(t)$ for the respective user terminals to the IDCT units 214.

The IDCT units 214 serving as second transforming units perform an Inverse Discrete Cosine Transform (IDCT) on the channel time responses $H_n(t)$ of the user terminals, and thereby transforms the channel time responses $H_n(t)$ into frequency domain and obtain channel frequency responses $h_n(k)$ of the received pilot signals for the respective user terminals, which are shown in the following equation (16).

$$h_n(k) = \sum_{K=1}^{L} w(t) H_n(t) \cos \frac{\pi(2k-1)(t-1)}{2L} \quad (16)$$

Note that when $t = 1$, $w(t) = \frac{1}{\sqrt{L}}$ when $t \neq 1$, $w(t) = \sqrt{\frac{2}{L}}$ $n = 1, 2, \cdots, N$ The IDCT units 214 output the channel frequency responses $h_n(k)$ of the received pilot signals for the respective user terminals which are obtained in the above-described manner, to the demultiplexing/equalizing unit 206 as the results of estimation of the channel characteristics of the received signals for the respective user terminals.

According to the base station apparatus 201 having the above-described configuration, since the DCT unit 212 in the channel estimating unit 210 transforms a channel frequency response h(k) of a received multiplexed pilot signal r(k) into a channel time response H(t) by a discrete cosine transform, the occurrence of a discontinuous portion of data upon periodic extension, which is seen in an IDFT in the above-described conventional example, can be prevented. As a result, delay spread occurring in the channel time responses $H_n(t)$ of the respective received pilot signals for the respective user terminals in the channel time response H(t) of the received pilot signal r(k) can be prevented from increasing.

FIG. 14 is a diagram for describing a mode of periodic extension by a discrete cosine transform, and (a) of FIG. 14 shows the case of a discrete cosine transform and (b) of FIG. 14 shows the case of an IDFT.

An IDFT is a computation to perform a transform into time domain by applying a discrete-time Fourier transform to a countably infinite number of signal sequences obtained by periodically extending an original frequency domain signal having a data length of L. Hence, as shown in (b) of FIG. 14, data is likely to be discontinuous at the boundaries of extended portions. This discontinuity invites an increase in higher-order coefficient, becoming a cause of an increase in delay spread after a time domain transform.

On the other hand, a discrete cosine transform is equivalent to the application of a discrete Fourier transform to a signal generated by performing extension on an original function signal having a data length of L such that the signal is even symmetric with respect to a boundary point. Hence, in a discrete cosine transform, as shown in (a) of FIG. 14, data continuity is maintained at the boundaries of extended portions.

From the continuity at the boundaries of extended portions, the discrete cosine transform has a characteristic of allowing signal components to be concentrated on the low frequency side. Therefore, delay spread of data after being transformed into time domain can be kept small.

FIG. 15 is a diagram for describing a mode when a channel frequency response is transformed into time domain, and (a) of FIG. 15 shows an example of the case of a discrete cosine transform and (b) of FIG. 15 shows an example of the case of an IDFT. In the drawing, the horizontal axis represents time and the vertical axis represents power. In addition, FIG. 15 shows data of two adjacent user terminals and the data are respectively distinguished by solid square symbols and open square symbols.

In the drawing, in the case of the discrete cosine transform, spread in the time-axis direction is smaller as compared with the case of the IDFT, and data of a single user terminal stays within the range of a window width. On the other hand, in the case of the IDFT, spread in the time direction is large and there are signals having relatively large values at positions exceeding a window width and thus these data located outside the window width are not obtained and are lost.

As such, according to the present embodiment, since delay spread of data after being transformed into time domain data can be kept small, when a channel time response is separated into channel time responses $H_n(t)$ for the respective user terminals by the windowing process unit 213, a data portion can be suppressed from spreading beyond a window width in a windowing process, making it possible to suppress data loss. As a result, the occurrence of distortion in estimation channel characteristics can be suppressed, making it possible to increase channel estimation accuracy.

In addition, in the present embodiment, the configuration may be such that when a channel frequency response h(k) of a received multiplexed pilot signal r(k) is transformed into a channel time response H(t) by a discrete cosine transform, as shown in FIG. 15, signals of power less than or equal to a predetermined threshold value are regarded as noise and thus are removed. In this case, the influence of noise included in data signals can be suppressed.

Note that the configuration in which signals of power less than or equal to the predetermined threshold value are regarded as noise and thus are removed can also be used for channel estimation by an IDFT.

2.2 Second Embodiment

FIG. 16 is a block diagram showing a configuration of a channel estimating unit 210 included in a base station apparatus 201 according to a second embodiment of the present invention.

The channel estimating unit 210 of the present embodiment includes a division unit 211, multiplication units 221, extension processing units 222, LPFs (low pass filters) 223, and delay component removing units 224.

As with the above-described first embodiment, the division unit 211 divides a received pilot signal r(k) provided from an FFT unit 205 by a basic pilot signal s(k) which is a known signal and thereby obtains a channel frequency response h(k) of the received multiplexed pilot signal r(k).

The multiplication units 221 multiply the channel frequency response h(k) of the received pilot signal r(k) by (complex constants $e^{-j\alpha Nk}$ representing) the amounts of shift obtained based on the cyclic shifts of respective pilot signals set for respective user terminals, and thereby obtain channel frequency responses $h_n'(k)$ where channel frequency responses $H_n(k)$ for the respective user terminals are shifted to their respective original frequencies.

The multiplication units 221 obtain the channel frequency responses $h_n'(k)$ shifted to their respective original frequencies, such that they are associated with the respective received pilot signals of the user terminals.

The extension processing units 222 perform an even symmetric extension process on the channel frequency responses $h_n'(k)$ where the channel frequency responses $h_n(k)$ of the received pilot signals of the user terminals (hereinafter, also simply referred to as the channel frequency responses $H_n(k)$) are shifted to their respective original frequencies by the multiplication units 221, and thereby obtain processed functions having been subjected to the even symmetric extension process, such that they are associated with the respective user terminals.

(a) of FIG. 17 is a diagram schematically showing an example of a processed function $h_n''(k)$ after performing an even symmetric extension process.

As shown in the drawing, the processed function $h_n''(k)$ has data D1 forming a channel frequency response h(k) and extended data D2 and D3 arranged before and after the data D1 on a frequency axis. These extended data D2 and D3 are provided so as to be line-symmetric to the data D1 with respect to the boundaries between the data D1 and the data D2 and D3, and are even symmetric with respect to the data D1.

In addition, the extended data D2 and D3 are provided so as to have the length of the group delay of the LPF 223. In the present embodiment, as will be described later, the LPF 223 is configured by an FIR (Finite Impulse Response) filter with the length of group delay being ½ of the tap length, and the extended data D2 and D3 are provided so as to be ½ of the tap length of the LPF 223. Therefore, when the elements forming the data D1 (channel frequency response h(k)) are represented by the following equation (17):

Transmission line frequency response $h(k)=$
$[x(1),x(2), \ldots ,x(L)]$ (17), the elements forming the processed function $h_n''(k)$ obtained by performing an even symmetric extension process on the channel frequency response h(k) can be represented as shown in the following equation (18):

Processed function $h_n''(k)=[x(M/2),$
$x((M/2)-1), \ldots ,x(1),x(1), \ldots ,x(L),$
$x(L-1), \ldots ,x(L-(M/2)-1)]$ (18).

Note that in the above-described equation (8), M is the tap length of the LPF 223.

Note also that in the above-described equation (8), the "x(M/2), x((M/2)-1), . . . , x(1)" portion corresponds to the extended data D2 portion, and the "x(L-1), . . . , x(L-(M/2)-1)" portion corresponds to the extended data D3 portion.

Each LPF 223 is configured by, for example, an FIR filter and has the function of obtaining only a channel frequency response $h_n(k)$ of a user terminal that is shifted to its original frequency, from the processed function $h_n''(k)$ obtained by the extension processing unit 222.

Namely, in the processed function $h_n''(k)$, since the transmission path frequency response $h_n(k)$ of a single user terminal is shifted to its original frequency, by setting the cut-off value of an LPF 223 such that only the channel frequency response $h_n(k)$ portion is allowed to pass through and other portions are not allowed to pass through, the LPF 223 can obtain only the channel frequency response $h_n(k)$ of the user terminal that is shifted to its original frequency.

The delay component removing units 224 have the function of removing delay components, the occurrence of which is unavoidable in the channel frequency responses $h_n(k)$ of the respective user terminals which are obtained by the LPFs 223.

(b) of FIG. 17 is a schematic diagram showing a channel frequency response $h_n(k)$ of a single user terminal obtained by an LPF 223. As shown in the drawing, delay components which occur as a result of passing through the LPF 223 are present on the low frequency side of data d1 forming the channel frequency response $h_n(k)$ of a single user terminal. The delay components generally occur by a length corresponding to the tap length of the LPF 223, and the elements forming the channel frequency response $h_n(k)$ of the single user terminal including the delay components after passing through the LPF 223 are represented by the following equation (19):

Transmission line frequency response $h_n(k)$ of the
single user terminal (including delay components)=$[h_n(1),h_n(2), \ldots ,h_n(L+M)]$ (19).

In addition, a channel frequency response $h_n(k)$ of the single user terminal where the delay components are removed from the channel frequency response $h_n(k)$ of the single user terminal shown in equation (19) is represented by the following equation (20):

Transmission line frequency response $h_n(k)$ of the
single user terminal=$[h_n(M+1),h_n(M+2), \ldots ,h_n(M+L)]$ (20).

As such, in the present embodiment, since the delay component removing units 224, each removing delay components included in a channel frequency response $h_n(k)$ of a single user terminal after passing through a corresponding LPF 223, are provided, channel time responses $h_n(k)$ for the respective user terminals can be obtained more accurately.

In the above-described manner, the channel estimating unit 210 of the present embodiment outputs the channel frequency responses $h_n(k)$ of the received pilot signals for the respective user terminals which are obtained by removing delay components by the delay component removing units 224, to a demultiplexing/equalizing unit 206 as the results of estimation of the channel characteristics of the received signals for the respective user terminals.

According to the base station apparatus 201 having the above-described configuration, since the extension processing units 222 in the channel estimating unit 210 perform an even symmetric extension process on a channel frequency response h(k) of a received pilot signal r(k), data loss occurring when separating and obtaining channel frequency responses $h_n(k)$ for respective user terminals by the multiplication units 221 and the LPFs 223 can be suppressed. As a result, the occurrence of distortion in estimation channel characteristics can be suppressed, making it possible to increase channel estimation accuracy.

In addition, in the base station apparatus 201 of the present embodiment, since channel frequency responses $h_n(k)$ for the respective user terminals are obtained in the frequency domain, there is no need to perform a process with a large amount of computation such as an IDFT, making it possible to achieve a configuration in which the load on the apparatus can be reduced.

In addition, in the present embodiment, since each extension processing unit 222 extends data by a length corresponding to the group delay of a corresponding LPF 223 (extended data D2 and D3) in an even symmetric extension process, while performing extension with the minimum necessary amount of data, data loss caused by the LPF 223 can be more effectively suppressed.

Note that the present invention is not limited to the above-described embodiments. Although in the above-described embodiments the case in which a communication apparatus of the present invention is applied to a base station apparatus is exemplified, the communication apparatus can also be applied to the user terminal side.

Note also that although in the second embodiment the case is exemplified in which the channel estimating unit 210 includes the division unit 211, the multiplication units 221, the extension processing units 222, the LPFs 223, and the delay component removing units 224, the channel estimating unit 210 can also be configured in a form where, of those units, the extension processing units 222 are omitted, i.e., configured by the division unit 211, the multiplication units 221, the LPFs 223, and the delay component removing units 224.

In this case, channel frequency responses $h_n'(k)$ for the respective received pilot signals of the respective user terminals, which are shifted to their respective original frequencies and which are obtained by the multiplication units 221 are directly outputted to their corresponding LPFs 223.

The LPFs 223 obtain only channel frequency responses $h_n(k)$ of the user terminals which are shifted to their respective original frequencies, from the channel frequency responses $h_n'(k)$ shifted to their respective original frequencies. The delay component removing units 224 remove delay components included in the channel frequency responses $h_n(k)$ of the respective user terminals which are obtained by the LPFs 223.

In the above-described manner, the channel estimating unit 210 having the above-described configuration can obtain the channel frequency responses $h_n(k)$ of the received pilot signals for the respective user terminals as the results of estimation of the channel characteristics of the received signals for the respective user terminals.

According to a base station apparatus including the channel estimating unit 210 having the above-described configuration, since channel frequency responses of a respective plurality of received pilot signals can be obtained in the frequency domain, there is no need to perform a process with a large amount of computation such as an IDFT, making it possible to achieve a simple configuration.

2.3 For Verification of Advantageous Effects

The inventors of the present invention perform a simulation to perform channel estimation by demultiplexing a received multiplexed pilot signal using base station apparatuses according to the above-described embodiments, and verify the advantageous effects thereof over the case of performing channel estimation by a conventional method.

For a comparative example, a base station apparatus is used that performs channel estimation by a method in which, as described in the above conventional example, a channel frequency response of a received multiplexed pilot signal is transformed into a channel time response by an IDFT and the channel time response is separated and thereafter the separated channel time responses are transformed into frequency domain by a DFT.

For implementation examples of the present invention, the base station apparatus 201 including the DCT unit 212 and the IDCT units 214 which is shown in the first embodiment is used in a first implementation example, and the base station apparatus 201 including LPF units which is shown in the second embodiment is used in a second implementation example.

For a verification method, with the same conditions being set for the first and second implementation examples and the comparative example, a simulation for channel estimation is performed using a received pilot signal where pilot signals for 2 user terminals are multiplexed, and estimation results obtained by the simulation are graphed for comparison.

FIG. 18 is graphs showing channel estimation results for the implementation examples and the comparative example, and (a-1) and (a-2) of FIG. 18 are graphs showing channel estimation results for the first implementation example, (b-1) and (b-2) of FIG. 18 for the second implementation example, and (c-1) and (c-2) of FIG. 18 for the comparative example. In FIG. 17, the horizontal axis represents frequency and the vertical axis represents amplitude, and channel estimation results for one user terminal are shown on the left side of the drawing and channel estimation results for the other user terminal are shown on the right side.

In the drawing, taking a look at the channel estimation results for the comparative example, it can be seen that distortion occurs at both ends of the band.

On the other hand, the channel estimation results for the first and second implementation examples do not exhibit distortion such as that exhibited in the comparative example and thus it can be seen that channel estimation is performed accurately.

FIG. 19 shows an example of representations of data in constellation maps obtained when being demodulated using the channel estimation results for the first implementation example and the comparative example which are verified by the simulation, and (a) of FIG. 19 shows a representation for the first implementation example and (b) of FIG. 19 shows a representation for the comparative example.

It can be seen that while in the representation for the comparative example data are scattered around each bit position, in the representation for the first implementation example data are accurately demodulated in each bit position.

As such, it has been found that under the conditions in the verification, the base station apparatuses 201 according to the embodiments can improve channel estimation accuracy and increase demodulation accuracy over the apparatus using the conventional method.

Chapter 3 Resource Allocation

A preferred embodiment of the present invention will be described below with reference to the accompanying drawings. Note that in the present embodiment description is made using LTE as an example of a communication scheme but the communication scheme is not limited thereto.

FIG. 20 shows a radio communication system of an LTE scheme (e.g., a communication system for mobile phones). The radio communication system includes a base station apparatus 301 and user terminals 302a and 302b. The base station apparatus 301 includes a plurality of antennas and can perform multi-user MIMO transmission.

In addition, the base station apparatus 301 of the present embodiment is suitably used as a femto base station apparatus that forms a relatively small femtocell as its coverage area. The femto base station apparatus 301 is installed in a location where radio waves do not reach with a macro base station apparatus that forms a relatively large macrocell as its coverage area, etc.

Note that LTE is as described in Chapter 2.

The base station apparatus 301 includes a scheduling unit 311 that performs resource allocation (resource block allocation) to users in the uplink and the downlink. The scheduling unit 311 can perform scheduling using spatial division multiplexing where a single resource block is allocated to a plurality of user terminals, in addition to frequency division multiplexing where a resource block in a frame is allocated to each user terminal.

Note that uplink user allocation information (MAP information) is notified to each of the user terminals 302a and 302b, using a downlink frame. Each of the user terminals 302a and 302b performs uplink communication using one or a plurality of resource blocks allocated thereto by the base station apparatus 301.

When taking a look at a given resource block with which spatial division multiplexing is performed, the plurality of user terminals 302a and 302b simultaneously transmit signals $x_1$ and $x_2$ in the resource block.

In LTE, a Zadoff-Chu/CGS (ZC) is used as a reference signal (pilot signal) for an uplink signal. In spatial division multiplexing of the present embodiment, instead of allocating completely the same resource block to a plurality of user terminals to be spatially multiplexed, partially different resource blocks are allocated to the plurality of user terminals. When completely the same resource is thus not used, the ZC sequence length varies between the plurality of user terminals. In this case, orthogonality is not guaranteed only by using different cyclic shifts for the plurality of user terminals. Hence, in the present embodiment, in order to effectively perform interference removal, the amount of cyclic shift of a pilot signal is set such that a cross-correlation between pilot signals is small (below a predetermined threshold value serving as a reference for ensuring orthogonality). By this, orthogonality between pilot signals is guaranteed and thus a spatially multiplexed signal can be securely demultiplexed.

The base station apparatus 301 receives spatially multiplexed signals from the plurality of user terminals 302*a* and 302*b* by a plurality of receiving antennas. The base station apparatus includes a signal demultiplexing unit 312 that demultiplexes the received spatially multiplexed signals into signals from the respective user terminals 302*a* and 302*b*.

The signal demultiplexing unit 312 performs signal demultiplexing using an adaptive array process instead of a conventional general signal demultiplexing method. As shown in FIG. 21, the signal demultiplexing unit 312 includes weight computing units 121*a* and 121*b* that perform a weight computation for an adaptive array process; pilot generating units 122*a* and 122*b* that generate pilot signals; and array combining units 123*a* and 123*b*.

In FIG. 21, the signal demultiplexing unit 312 includes the first weight computing unit 121*a*, the first pilot generating unit 122*a*, and the first array combining unit 123*a* for obtaining signals from the first user terminal 302*a*; and the second weight computing unit 121*b*, the second pilot generating unit 122*b*, and the second array combining unit 123*b* for obtaining signals from the second user terminal 302*b*. Note that the number of user terminals is not limited to two.

The signal demultiplexing unit 312 demultiplexes spatially multiplexed signals $y_1$ and $y_2$ received by the plurality of antennas (here, two antennas) into signals $\hat{x}_1$ and $\hat{x}_2$ from the respective user terminals 302*a* and 302*b*. Note that the signal $\hat{x}_1$ is an estimated value of a transmitted signal $x_1$ from the first user terminal 302*a* (a value obtained by the signal demultiplexing unit 312) and the signal $\hat{x}_2$ is an estimated value of a transmitted signal $x_2$ from the second user terminal 302*b* (a value obtained by the signal demultiplexing unit 312).

As shown in (a) of FIG. 22, when, of a plurality of spatially multiplexed signals $x_1$ and $x_2$, the signal $x_1$ from the first user terminal 302*a* is to be obtained, the signal demultiplexing unit 312 performs an adaptive array process, regarding, of the plurality of signals $x_1$ and $x_2$, only the signal $x_1$ from the first user terminal 302*a* as a desired signal. By this, the signal $x_2$ from the second user terminal 302*b* is regarded as an interference signal. In the adaptive array process, the antenna directivity is directed to the direction of the desired signal and the direction of the interference signal is null, and thus, only the signal $x_1$ regarded as the desired signal can be extracted.

On the other hand, as shown in (b) of FIG. 22, when, of a plurality of spatially multiplexed signals $x_1$ and $x_2$, the signal $x_2$ from the second user terminal 302*b* is to be obtained, the signal demultiplexing unit 312 performs an adaptive array process, regarding, of the plurality of signals $x_1$ and $x_2$, only the signal $x_2$ from the second user terminal 302*b* as a desired signal. By this, the signal $x_1$ from the first user terminal 302*a* is regarded as an interference signal and thus only the signal $x_2$ regarded as the desired signal can be extracted.

The weight computing units 121*a* and 121*b* compute weights on a per resource block basis, the resource block being a minimum unit of resource allocation to users. Namely, when computing a weight in a certain resource block, only those reference signals included in the certain resource block are used without using those reference signals (pilot signals) in other resource blocks.

Note that in the present embodiment description is made using LTE as an example of a communication scheme but the communication scheme is not limited thereto.

Since a resource block is a minimum unit of resource allocation to users, in a single resource block there is no signal variation that is regarded as an interference signal among a plurality of spatially multiplexed signals.

In the case in which, as shown in FIG. 23, partially different resource blocks are allocated to a plurality of user terminals to be spatially multiplexed, instead of allocating completely the same resource block thereto, when a weight is computed in a wider region than a single resource block, the source of a signal regarded as an interference signal may vary. For example, when computing a weight for the entire region (including a plurality of resource blocks) allocated to user 1 in FIG. 23, in that region, as signals regarded as interference signals, there are a signal from user 2 and a signal from user 3. In this case, there are too may interfering sources and thus an appropriate adaptive array process may not be able to be performed. On the other hand, when a weight computation unit is a resource block, since other spatially multiplexed user terminals (user terminals regarded as interfering terminals) are invariant in the resource block, an appropriate adaptive array process can be performed.

Returning to FIG. 21, when the signal demultiplexing unit 312 obtains a signal from the first user terminal 302*a*, the first weight computing unit 121*a* obtains a reference signal (transmitted pilot) transmitted by the first user terminal 302*a* from the pilot generating unit 122*a*, and obtains an MMSE weight $w_1$ for a resource block associated with the first user terminal 302*a* based on reference signals (received pilots) z included in each of the received signals $y_1$ and $y_2$.

Here, an equation for obtaining an MMSE weight $w_k$ for a kth user terminal is as follows:

$$E[|e_k(i)|^2] = E[|s_k(i) - w_k^H z(i)|^2] \to \min$$

The above-described MMSE weight computation is performed on a per resource block basis, the resource block being allocated to the first user terminal 302*a*.

When a weight computation is performed by an SMI algorithm, the weight $w_k$ for the kth user terminal (k=1 to K; K is the number of user terminals) is calculated as follows:

$$w_k = R^{-1} p_k$$

$$R = \frac{1}{N} \sum_{i=1}^{N} z(i) \cdot z(i)^H$$

$$p_k = \frac{1}{N} \sum_{i=1}^{N} z(i) \cdot S_k(i)^*$$

z(i) is a received pilot and $S_k(i)$ is a transmitted pilot from the kth terminal.

$z(i)^H$ represents the complex conjugate transpose of z(i).

$s_k(i)$ represents the complex conjugate of s(i).

The weight $w_1 = \{w_{11}, w_{12}\}$ computed by the MMSE weight computing unit 121*a* is provided to the array combining unit 123*a* and an array combining process is performed, thereby obtaining an estimated value $\hat{x}_1$ of the signal $x_1$ transmitted by the first user terminal 302*a*. By this, the spatially multiplexed signal has been able to be demultiplexed into (the estimated value $\hat{x}_1$ of) the signal $x_1$ transmitted by the first user terminal 302*a*.

Note that array combining of the kth user terminal is performed based on the following equation:

$$\hat{x}_k = W_k^H \cdot y$$

An estimated value $\hat{x}_2$ of the signal $x_2$ transmitted by the second user terminal 302b is also calculated in the same manner as the above, using the MMSE weight computing unit 121b, the pilot generating unit 122b, and the array combining unit 123b.

Specifically, as shown in (b) of FIG. 22, when, of a plurality of spatially multiplexed signals $x_1$ and $x_2$, the signal $x_2$ from the second user terminal 302b is to be obtained, the signal demultiplexing unit 312 performs an adaptive array process, regarding, of the plurality of signals $x_1$ and $x_2$, only the signal $x_2$ from the second user terminal 302b as a desired signal. By this, the signal $x_1$ from the first user terminal 302a is regarded as an interference signal. Only the signal $x_2$ regarded as the desired signal can be extracted.

As such, in the signal demultiplexing unit 312 according to the present embodiment, an adaptive array process such as that described above is performed for each of the spatially multiplexed user terminals 302a and 302b. As a result, a spatially multiplexed signal can be demultiplexed into signals $x_1$ and $x_2$ transmitted by the respective user terminals 302a and 302b.

In addition, since the base station apparatus of the present embodiment is a femto base station apparatus that forms a relatively small-sized femtocell, there are very little multipath and delay which are likely to occur in a macrocell and thus the base station apparatus is suitable for performing the above-described adaptive array process.

Note that demultiplexing of a spatially multiplexed signal by an MMSE weight is represented as a matrix as follows:

$$\hat{x} = \begin{bmatrix} w_1^H \\ \vdots \\ w_K^H \end{bmatrix} \cdot y = \begin{bmatrix} w_{11} & \cdots & w_{1L} \\ \vdots & \ddots & \vdots \\ w_{K1} & \cdots & w_{KL} \end{bmatrix} \cdot y$$

(K×L) MIMO matrix representation
K: the number of transmitting terminals
L: the number of receiving antennas As shown in FIG. 23, even if partially different resource blocks are allocated to a plurality of user terminals to be spatially multiplexed, the signal demultiplexing unit 312 of the present embodiment can demultiplex a signal. Therefore, the scheduling unit 311 can perform flexible spatial division multiplexing scheduling such as that shown in FIG. 23, without being subjected to the constraint that, as shown in FIG. 27, completely the same resource block be allocated to a plurality of user terminals to be spatially multiplexed, and thus, efficient scheduling can be performed. As a result, an increase in system throughput can be achieved.

FIG. 24 shows an example of resource block allocation (scheduling process) and a signal demultiplexing process, using the above-described adaptive array process (hereinafter, referred to as "adaptive array MIMO").

First, the base station apparatus measures a CINR (Carrier to Interference and Noise Ratio) of each user terminal 302 (no spatial division multiplexing) connected thereto by radio, and thereby obtains a first CINR value (step S1). Then, the base station apparatus performs a normal adaptive array process on each user terminal 302 (no spatial division multiplexing) connected thereto by radio (step S2) and then again measures a CINR and thereby obtains a second CINR value (step S3).

Then, the base station apparatus compares the first CINR value with the second CINR value to thereby determine whether there is an interfering terminal in an essential sense.

If there is a user terminal in a neighboring cell near the base station apparatus, e.g., if, as shown in FIG. 25, a user terminal (macro MS) 3102 connected by radio to a macro base station (macro BS) 3101 forming a macrocell is present near a femtocell, the user terminal 3102 is an interfering terminal that gives interference to the femtocell.

If there is such an interfering terminal 3102 in an essential sense, then priority needs to be given to removal of interference by the interfering terminal 3102. Thus, even if adaptive array MIMO is performed, regarding a spatially multiplexed user terminal in the femtocell as an interfering terminal, it is difficult to perform signal demultiplexing. Therefore, when there is the interfering terminal 3102 in an essential sense, it is preferred not to perform adaptive array MIMO.

The processes in steps S1 to S4 are processes for determining whether there is the interfering terminal 3102 (a user terminal in another cell) in an essential sense.

Upon measuring the first CINR value in step S1, since a normal adaptive array process for removing interference from the interfering terminal 3102 (step S2) is not performed, when there is the interfering terminal 3102, the first CINR value is low. On the other hand, the second CINR value measured with an adaptive array process for removing interference from the interfering terminal 3102 (step S2) being performed is a relatively large value even if there is the interfering terminal 3102.

On the other hand, when there is no interfering terminal 3102, the first CINR value and the second CINR value are supposed to be substantially equal to each other.

Therefore, by comparing the first CINR value with the second CINR value, a determination as to whether there is the interfering terminal 3102 can be made (step S4). More specifically, a determining unit 313 of the base station apparatus determines whether there is an interfering terminal such that if the second CINR value is (sufficiently) larger than the first CINR value, then the determining unit 313 determines that there is the interfering terminal 3102, and if not then the determining unit 313 determines that there is no interfering terminal 3102, and thereby determines whether signal demultiplexing by AA-MIMO can be performed.

If it is determined in step S4 that there is the interfering terminal 3102, then since it is difficult to perform signal demultiplexing using adaptive array MIMO (AA-MIMO), the scheduling unit 311 of the base station apparatus performs a resource block allocation process that does not use spatial division multiplexing, for the uplink (step S5). In this case, since spatial division multiplexing is not performed, demultiplexing of a spatially multiplexed signal is not required. Note that if there is the interfering terminal 3102, spatial division multiplexing may be performed under the constraint that completely the same resource block be allocated to a plurality of user terminals to be spatially multiplexed. In this case, the signal demultiplexing unit 312 performs demultiplexing of a spatially multiplexed signal by a conventional demultiplexing method where a channel matrix H is estimated.

If it is determined in step S4 that there is no interfering terminal 3102, then the scheduling unit 311 performs a resource block allocation process using spatial division multiplexing (spatial division multiplexing scheduling) for the uplink, premising that AA-MIMO is performed (step S6). In the AA-MIMO, since signal demultiplexing can be performed without using the same frequency resource between user terminals to be spatially multiplexed, flexibility in resource allocation increases.

Determined uplink user allocation information (MAP information) is notified to each of the user terminals 302a and 302b, using a downlink frame. Each of the user terminals 302a and 302b performs uplink communication using one or a plurality of resource blocks allocated thereto by the base station apparatus.

Then, the signal demultiplexing unit 312 demultiplexes a spatially multiplexed signal from the user terminals 302a and 302b by AA-MIMO (step S7).

Note, however, that when the plurality of user terminals 302a and 302b to be spatially multiplexed are located in substantially the same direction as viewed from the base station apparatus, since signals from the respective user terminals 302a and 302b arrive from substantially the same direction, it is difficult to direct a null toward a user terminal that is regarded as an interfering terminal and thus even if AA-MIMO is performed, the signal may not be able to be demultiplexed. That is, even if AA-MIMO is performed, a signal from a user terminal regarded as an interfering terminal (interference signal) cannot be removed, resulting in a low CINR value. Thus, a signal from a user terminal regarded as a desired terminal (desired signal) may not be able to be obtained. As a result, signal demultiplexing cannot be performed.

Hence, in step S8, it is determined whether demultiplexing of the spatially multiplexed signal has been able to be performed in the signal demultiplexing process in step S7. Specifically, the determining unit 313 determines whether signal demultiplexing has been able to be performed (whether signals from the respective user terminals have been able to be obtained), based on the result of an attempt to perform signal demultiplexing by AA-MIMO by the signal demultiplexing unit 312.

If it is determined in step S8 that demultiplexing has not been able to be performed, then processing returns to step S6 and another scheduling is performed. In another scheduling, resource block allocation is performed such that different resource blocks are allocated to a plurality of user terminals whose signals have not been able to be demultiplexed. By this, in another demultiplexing process by AA-MIMO (step S7), the possibility of being able to perform signal demultiplexing increases.

It is to be noted that the embodiments disclosed herein are to be considered in all respects as illustrative and not restrictive. The scope of the present invention is indicated by the appended claims rather than by the foregoing meaning, and all changes which come within the meanings and range of equivalency of the claims are therefore intended to be embraced therein.

REFERENCE SIGNS LIST 1a and 1b: ANTENNA
7: COMBINING UNIT
8: WEIGHT CALCULATING UNIT
8a: CALCULATING UNIT
8b: SELECTING UNIT
BS1 and BS2: BASE STATION APPARATUS (COMMUNICATION APPARATUS)
MS1 to MS6: MOBILE TERMINAL (USER)
201: BASE STATION APPARATUS (COMMUNICATION APPARATUS)
210: CHANNEL ESTIMATING UNIT
212: DCT UNIT (FIRST TRANSFORMING UNIT)
213: WINDOWING PROCESS UNIT
214: IDCT UNIT (SECOND TRANSFORMING UNIT)
221: MULTIPLICATION UNIT
222: EXTENSION PROCESSING UNIT
223: LPF (FILTER UNIT)
224: DELAY COMPONENT REMOVING UNIT (REMOVING UNIT)
301: BASE STATION APPARATUS
302a and 302b: USER TERMINAL
311: SCHEDULING UNIT
312: SIGNAL DEMULTIPLEXING UNIT
313: DETERMINING UNIT
121a and 121b: WEIGHT COMPUTING UNIT
122a and 122b: PILOT GENERATING UNIT
123a and 123b: ARRAY COMBINING UNIT

The invention claimed is:

1. A communication apparatus comprising a weight calculating unit that calculates weights of a respective plurality of known signals included in a received signal, by a calculation method where a sequential update is performed on a per known signal basis, the weights being adaptive array antenna weights for combining a plurality of received signals received by a plurality of antennas, wherein
the weight calculating unit comprises:
a calculating unit that calculates a plurality of weights including at least a first adaptive array antenna weight and a second adaptive array antenna weight of a target known signal being an update target, the first adaptive array antenna weight being obtained by updating, using the target known signal and a first estimation error, an adaptive array antenna weight of a first another known signal updated immediately before performing an update using the target known signal, the second adaptive array antenna weight being obtained by updating, using the target known signal and a second estimation error, an adaptive array antenna weight of a second another known signal different than the first another known signal, the first estimation error being an error of a signal obtained by combining a plurality of received target known signals received by a plurality of antennas using the adaptive array antenna weight of the first another known signal, and the second estimation error being an error of a signal obtained by combining a plurality of received target known signals received by a plurality of antennas using the adaptive array antenna weight of the second another known signal; and
a selecting unit that selects one of the plurality of adaptive array antenna weights of the target known signal having a lower estimation error which was used for updating, as an adaptive array antenna weight of the target known signal.

2. The communication apparatus according to claim 1, wherein
the calculating unit:
selects a plurality of predetermined regions in a plurality of orders including at least a first order and a second order different than the first order, each of the plurality of predetermined regions consisting of one or a plurality of minimum units of radio allocation; and
at least calculates, every time a predetermined region is selected in the first order, a first weight using a known signal included in the selected predetermined region, and calculates, every time a predetermined region is selected in the second order, a second weight using a known signal included in the selected predetermined region.

3. The communication apparatus according to claim 2, wherein the second order is reverse order to the first order.

4. The communication apparatus according to claim 2, wherein each of the predetermined regions is a region that can be identified as being allocated to a same user, without referring to user allocation information.

5. The communication apparatus according to claim 2, wherein each of the minimum units of radio allocation is a resource block.

6. The communication apparatus according to claim 2, wherein the first and second orders are orders in which the predetermined regions are arranged along at least one of a frequency direction and a time direction.

7. The communication apparatus according to claim 1, wherein the target known signal, the first another known signal, and the second another known signal are arranged along at least one of a frequency direction and a time direction.

8. The communication apparatus according to claim 1, wherein the received signal is a signal to be transmitted by a scheme for allocating a plurality of consecutively arranged minimum units to a single user.

9. The communication apparatus according to claim 8, wherein the scheme for allocating a plurality of consecutively arranged minimum units to a single user is an SC-FDMA scheme.

* * * * *